(12) United States Patent
Zimmerman et al.

(10) Patent No.: US 11,439,852 B2
(45) Date of Patent: *Sep. 13, 2022

(54) AERIAL FIRE SUPPRESSION SYSTEM

(71) Applicant: Simplex Manufacturing Co., Portland, OR (US)

(72) Inventors: Mark D. Zimmerman, Kalama, WA (US); David M. Kruithoff, Vancouver, WA (US)

(73) Assignee: Simplex Manufacturing Co., Portland, OR (US)

( * ) Notice: Subject to any disclaimer, the term of this patent is extended or adjusted under 35 U.S.C. 154(b) by 271 days.

This patent is subject to a terminal disclaimer.

(21) Appl. No.: 16/532,182

(22) Filed: Aug. 5, 2019

(65) Prior Publication Data

US 2019/0358475 A1 Nov. 28, 2019

Related U.S. Application Data

(63) Continuation of application No. 15/966,937, filed on Apr. 30, 2018, now Pat. No. 10,369,392, which is a
(Continued)

(51) Int. Cl.
*A62C 3/02* (2006.01)
*B64D 1/16* (2006.01)
(Continued)

(52) U.S. Cl.
CPC ............ *A62C 3/0242* (2013.01); *A62C 5/022* (2013.01); *A62C 31/12* (2013.01); *A62C 31/24* (2013.01); *B64D 1/16* (2013.01); *B64D 1/18* (2013.01)

(58) Field of Classification Search
CPC ... A62C 3/0242; A62C 3/0228; A62C 3/0292; A62C 5/00; A62C 5/02–027;
(Continued)

(56) References Cited

U.S. PATENT DOCUMENTS 2,198,585 A 4/1940 Urquhart et al.
2,249,095 A 7/1941 Swift et al.
(Continued)

FOREIGN PATENT DOCUMENTS

AU 2006292025 C1 3/2007
AU 2006319757 B2 6/2007
(Continued)

OTHER PUBLICATIONS

Bloch, Heinz P. Soares, Claire. (1998). Process Plant Machinery (2nd Edition)—7.3 High-Speed Centrifugal Pumps. Elsevier. Online version available at <http://app.knovel.com/hotlink/pdf/id:kt00C1CV13/process-plant-machinery/high-speed-centrifugal> (Year: 1998).*

(Continued)

*Primary Examiner* — Cody J Lieuwen
(74) *Attorney, Agent, or Firm* — Neal, Gerber & Eisenberg LLP

(57) ABSTRACT

A fire suppression apparatus for fighting fires from a vehicle configured for flight is disclosed, comprising a foam and water held in separate containers aboard the vehicle that when mixed forms a fire retardant, a pump driven by an electric motor to pressurize the fire retardant, the pump including an air induction valve where air is drawn into a suction end of the pump and pressurized together with the fire retardant, and an aimable boom connected to the pump by a conduit, the boom including a nozzle on a distal end of the boom from which the pressurized fire retardant and air is dispensed toward a target.

20 Claims, 28 Drawing Sheets

Related U.S. Application Data continuation of application No. 15/135,880, filed on Apr. 22, 2016, now Pat. No. 99,811,150, which is a continuation of application No. 13/750,623, filed on Jan. 25, 2013, now Pat. No. 9,333,379.

(60) Provisional application No. 61/591,791, filed on Jan. 27, 2012.

(51) Int. Cl.
    *A62C 5/02* (2006.01)
    *A62C 31/24* (2006.01)
    *A62C 31/12* (2006.01)
    *B64D 1/18* (2006.01)

(58) Field of Classification Search
    CPC .......... A62C 31/12; A62C 31/24; B64D 1/16; B64D 1/18; F04D 13/16; F04D 15/0022
    USPC .............. 239/171; 169/13–15, 53; 417/295, 417/423.1, 432.6, 423.15; 261/DIG. 26
    See application file for complete search history.

(56) References Cited

U.S. PATENT DOCUMENTS

| | | | |
|---|---|---|---|
| 2,961,050 | A | 11/1960 | MacCracken |
| 3,220,482 | A | 11/1965 | Eveleth |
| 3,234,962 | A * | 2/1966 | Williamson ......... A62C 25/005 137/565.11 |
| 3,273,651 | A | 9/1966 | Andrews |
| 3,424,250 | A | 1/1969 | Thomae |
| 3,438,445 | A | 4/1969 | MacCracken |
| 3,510,107 | A | 5/1970 | Ridley |
| 3,580,339 | A | 5/1971 | Nance |
| 3,581,504 | A | 6/1971 | Andrus |
| 3,714,987 | A * | 2/1973 | Mattson .................. B64D 1/16 169/47 |
| 3,754,601 | A | 8/1973 | Linkewich |
| 3,759,330 | A | 9/1973 | Rainey et al. |
| 3,846,515 | A * | 11/1974 | Williamson ............ A62C 5/002 261/18.3 |
| 3,897,829 | A | 8/1975 | Eason |
| 3,977,474 | A | 8/1976 | Boegli |
| 4,090,567 | A | 5/1978 | Tomlinson |
| 4,390,069 | A | 6/1983 | Rose, Jr. |
| 4,477,289 | A | 10/1984 | Kurtgis |
| 4,589,614 | A | 5/1986 | Stevens |
| 4,614,237 | A | 9/1986 | Colodner et al. |
| 4,633,895 | A | 1/1987 | Eberhardt |
| 4,662,454 | A | 5/1987 | Uchiyama et al. |
| 4,669,548 | A | 6/1987 | Colodner et al. |
| 4,729,434 | A | 3/1988 | Rohrbach |
| 4,828,038 | A | 5/1989 | Williams |
| 4,979,571 | A * | 12/1990 | MacDonald ......... A62C 3/0242 169/14 |
| 4,981,178 | A | 1/1991 | Bundy |
| 4,993,665 | A | 2/1991 | Sparling |
| 5,009,244 | A | 4/1991 | Grindley et al. |
| 5,086,846 | A | 2/1992 | Carlson |
| 5,125,458 | A | 6/1992 | Berman |
| 5,135,055 | A | 8/1992 | Bisson |
| 5,137,233 | A | 8/1992 | Maimon et al. |
| 5,174,383 | A | 12/1992 | Haugen et al. |
| 5,248,436 | A | 9/1993 | Kovaletz |
| 5,385,208 | A | 1/1995 | Baker et al. |
| 5,411,100 | A | 5/1995 | Laskaris et al. |
| 5,477,672 | A | 12/1995 | Tsujikado et al. |
| 5,549,259 | A | 8/1996 | Herlik |
| 5,575,341 | A | 11/1996 | Baker et al. |
| 5,607,020 | A | 3/1997 | Gebhardt |
| 5,623,995 | A | 4/1997 | Smagac |
| 5,632,338 | A | 5/1997 | Hunter |
| 5,648,052 | A | 7/1997 | Schaefer et al. |
| 5,699,862 | A | 12/1997 | Rey |
| 5,823,219 | A | 10/1998 | Purvis et al. |
| 5,904,165 | A | 5/1999 | McLean et al. |
| 5,927,648 | A | 7/1999 | Woodland |
| 6,003,782 | A | 12/1999 | Kim et al. |
| 6,009,953 | A | 1/2000 | Laskaris et al. |
| 6,089,324 | A | 7/2000 | Mahrt |
| 6,109,359 | A | 8/2000 | Ballard |
| 6,138,994 | A | 10/2000 | Rowe |
| 6,217,009 | B1 | 4/2001 | Rowe |
| 6,267,183 | B1 | 7/2001 | Smagac |
| 6,276,459 | B1 | 8/2001 | Herrick et al. |
| 6,311,780 | B1 | 11/2001 | Zuev et al. |
| 6,357,532 | B1 | 3/2002 | Laskaris et al. |
| 6,371,384 | B1 | 4/2002 | Garcia |
| 6,454,540 | B1 | 9/2002 | Terefinko et al. |
| 6,543,547 | B2 | 4/2003 | Neumeir et al. |
| 6,571,882 | B2 | 6/2003 | Yen |
| 6,588,199 | B2 | 7/2003 | Stechman, Jr. et al. |
| 6,634,433 | B2 | 10/2003 | Kim et al. |
| 6,644,595 | B2 | 11/2003 | Ramage et al. |
| 6,684,959 | B1 | 2/2004 | Juidici et al. |
| 6,688,402 | B1 | 2/2004 | Wise |
| 6,725,940 | B1 | 4/2004 | Klein et al. |
| 6,733,004 | B2 | 5/2004 | Crawley |
| 6,766,638 | B1 | 7/2004 | Tilston et al. |
| 6,874,734 | B2 | 4/2005 | Ramage et al. |
| 6,887,821 | B2 | 5/2005 | Mays et al. |
| 6,889,773 | B2 | 5/2005 | Hanratty |
| 6,889,776 | B2 | 5/2005 | Cheung |
| 6,973,975 | B1 * | 12/2005 | Adamson .................. A62C 5/02 169/24 |
| 6,991,041 | B2 * | 1/2006 | Laskaris .................. A62C 5/02 169/13 |
| 7,021,391 | B2 | 4/2006 | Schasteen |
| 7,055,615 | B2 | 6/2006 | Dillman |
| 7,165,627 | B2 | 1/2007 | Hutter et al. |
| 7,207,501 | B2 | 4/2007 | Hanratty |
| 7,458,427 | B2 | 12/2008 | Braun et al. |
| 7,513,315 | B2 | 4/2009 | Boyle et al. |
| 7,530,404 | B2 | 5/2009 | Lenz, Jr. |
| 7,788,993 | B2 | 9/2010 | Wood |
| 8,096,323 | B2 | 1/2012 | Von Mohos |
| 8,297,369 | B2 | 10/2012 | Gamble et al. |
| 9,333,379 | B2 | 5/2016 | Zimmerman et al. |
| 9,981,150 | B2 | 5/2018 | Zimmerman et al. |
| 10,369,392 | B2 | 8/2019 | Zimmerman et al. |
| 2004/0069505 | A1 | 4/2004 | Griffin |
| 2004/0069865 | A1 | 4/2004 | Rowe et al. |
| 2005/0222287 | A1 | 10/2005 | Roberts |
| 2006/0175429 | A1 | 8/2006 | Lanigan, Jr. et al. |
| 2006/0207659 | A1 | 9/2006 | Shaefer et al. |
| 2007/0110917 | A1 | 5/2007 | Okada |
| 2007/0196207 | A1 * | 8/2007 | Yonehara ................ F04D 5/002 415/206 |
| 2007/0209807 | A1 | 9/2007 | Kruger et al. |
| 2009/0146010 | A1 | 6/2009 | Cohen |
| 2010/0038098 | A1 | 2/2010 | Groonwald et al. |
| 2010/0065286 | A1 | 3/2010 | Hosfield |
| 2010/0116512 | A1 | 5/2010 | Henry |
| 2010/0126738 | A1 | 5/2010 | Kruger et al. |
| 2010/0175897 | A1 | 7/2010 | Crump |
| 2010/0176961 | A1 | 7/2010 | Nelson |
| 2010/0178176 | A1 | 7/2010 | Kenyon et al. |
| 2011/0042108 | A1 | 2/2011 | Hiebert |
| 2011/0127051 | A1 | 6/2011 | Guse |
| 2011/0168414 | A1 | 7/2011 | Nelson |
| 2012/0000680 | A1 | 1/2012 | Guse |
| 2013/0056230 | A1 | 3/2013 | Lemke et al. |
| 2013/0199806 | A1 | 8/2013 | Zimmerman et al. |
| 2014/0060309 | A1 | 3/2014 | Deckard et al. |
| 2014/0246213 | A1 | 9/2014 | Karagounis |
| 2016/0236023 | A1 | 8/2016 | Zimmerman et al. |
| 2018/0043194 | A1 | 2/2018 | Zimmerman et al. |
| 2018/0243595 | A1 | 8/2018 | Zimmerman et al. |

FOREIGN PATENT DOCUMENTS

| | | |
|---|---|---|
| CA | 2289617 | 11/1998 |
| CA | 2328972 | 10/1999 |

(56) References Cited

FOREIGN PATENT DOCUMENTS

| | | |
|---|---|---|
| CA | 2565290 | 1/2006 |
| CN | 1525873 | 9/2004 |
| CN | 201205979 | 3/2009 |
| CN | 201770004 | 3/2011 |
| CN | 102058943 | 5/2011 |
| CN | 104080699 | 10/2014 |
| EP | 1419310 B1 | 7/2007 |
| EP | 2807080 | 7/2019 |
| EP | 3527493 | 8/2019 |
| FR | 1481100 | 5/1967 |
| FR | 2959724 | 11/2011 |
| GB | 2246294 A | 1/1992 |
| HK | 1202847 | 10/2015 |
| HK | 1204468 | 11/2015 |
| JP | 198901151468 | 6/1989 |
| JP | 2119881 | 5/1990 |
| JP | 2006034529 | 2/2006 |
| JP | 2007319281 A | 12/2007 |
| JP | 4317093 | 8/2009 |
| RU | 2290237 | 12/2006 |
| RU | 2620400 | 3/2016 |
| WO | WO 94/23798 | 10/1994 |
| WO | WO 94/26353 | 11/1994 |
| WO | WO2007/062477 | 6/2007 |
| WO | WO2007/132454 | 2/2009 |
| WO | WO2009/100541 | 8/2009 |
| WO | WO2010/081046 | 7/2010 |
| WO | WO2011/154325 | 12/2011 |
| WO | 2013112896 | 8/2013 |

OTHER PUBLICATIONS

Peerless Pump Company, Technical Information Bulletin Number Ten, "Pump Inducers", Jul. 2006 (Year: 2006).*
"Slurry Device Manual 3: A Centrifugal Pump" W. Liljestrand Petroleum Industry Press. (5 pages).
China National Intellectual Property Administration, First Office Action in Chinese Patent Application No. 201680088290.7 (dated May 6, 2020) (16 pages).
China National Intellectual Property Administration, Second Office Action in Chinese Patent Application No. 201680088290.7 (dated Jan. 18, 2021).
European Patent Office, Extended European Search Report in European Application No. 16912824.6 (dated Mar. 3, 2020) (10 pages).
Anonymous: "Pump—Wikipedia", Jul. 25, 2016, XP055758154, retrieved from the internet: URL: https://en.wikipedia.org/w/index.php?title=Pump&oldid=731522745#Priming_a_pump [retrieved on Dec. 9, 2020) (11 pages).
European Patent Office, Communication pursuant to Article 94(3) EPC in European Patent Application No. 16912824.6 (dated Dec. 14, 2020) (11 pages).
Aerial-firefighting. Web page [online], [retrieved on Feb. 8, 2010] Retrieved from the Internet <URL: http://en.wikipedia.org/wiki/Aerial-firefighting>. (4 pages).
Aeropower—Electrical Insulator Washing. Web page [online]. [retrieved on Feb. 3, 2012] Retrieved from the Internet <URL:http://www.aeropower.com.au/electrical/services/liveLine/insulatorWashing.htm>. (1 Page).
Associated Airtanker Pilots Air Tanker Association Home page. Web page [online]. [retrieved on Feb. 8, 2010] Retrieved from the Internet <URL: http://www.airtanker.org/>. (3 pages).
Bloch, Heinz P. Soares, Claire. (1998). Process Plany Machinery ($2^{nd}$ Edition)—7.3 High-Speed Centrifugal Pumps. Elsevier. Online version available at : <http://app.knovel.com/hotlink/pdf/id:kt00C1CV13/process-plant-machinery/high-speed-centrifugal>.
Can you make a rocket engine using hyd. Per. And silver? [online]. [retrieved on Feb. 8, 2010] Retrieved from the Internet <URL: http://science.howstuffworks.com/question159.htm>. (3 pages).

Class 1—Welcome to Class 1. Web page [online], [retrieved on Feb. 8, 2010] Retrieved from the Internet <URL: http://www.class1.com/Main/Content.aspx>. (2 pages).
Compressed air foam system. Web page [online], [retrieved on Feb. 8, 2010] Retrieved from the Internet <URL: http://en.wikipedia.org/wiki/Compressed_Air_Foam_System>. (7 pages).
European Patent Office, Extended European Search Report for European Patent Application No. 19152770.4 (dated Jul. 10, 2019) (10 pages).
European Patent Office, Extended European Search Report for European Patent Application No. 13741238.3 (dated Jan. 27, 2016) (11 pages).
Guden, Al, Machine Design, "Properly specify and install gas springs for long-term lifting help," Feb. 17, 2009.
Haverfield Corporation. Web page [online]. [retrieved on Feb. 3, 2012] Retrieved from the Internet <URL: http://www.haverfield.com/services_energizedinsulator.html>. (1 page).
HTP Rocket Motors. Web page [online]. [retrieved on Feb. 8, 2010] Retrieved from the Internet <URL: http://www.spaceuk.org/htp/htp.htm>. (14 pages).
Hydrogen peroxide. Web page [online]. [retrieved on Feb. 8, 2010] Retrieved from the Internet <URL: http://en.wikipedia.org/wiki/Hydrogen_peroxide>. (17 pages).
Iframe. Web page [online]. [retrieved on Feb. 3, 2012] Retrieved from the Internet <URL: http://www.aerosud.co.za/products/ancillary.htm>. (1 page).
International Preliminary Report on Patentability for International Application No. PCT/US2013/023234, dated Jul. 29, 2014, 9 pages.
International Preliminary Report on Patentability for PCT Application No. PCT/US2016/046191 (dated Feb. 12, 2019 ) (10 pages).
International Search Report and Written Opinion for PCT Application No. PCT/US2016/046191 (dated Dec. 15, 2016) (24 pages).
International Search Report and Written Opinion for PCT Application No. PCT/CA2009/000187 (dated Jun. 2, 2009 ) (9 pages).
International Search Report and Written Opinion for PCT Application No. PCT/US2013/023234 (dated May 23, 2013) (15 pages).
Keese et al. Hydrogen Peroxide-Based Propulsion and Power Systems, [online]. Published Apr. 2004. Retrieved from the Internet <URL: http://hydrogen-peroxide.us/uses-biprop-combustion/Sandia-Hydrogen_Peroxide-Based_Propulsion_and_Power_Systems-2004.pdf>. (22 pages).
Our New Application Is Equipped With CAFS. Web page [online]. [retrieved on Feb. 8, 2010] Retrieved from the Internet <URL: http://www.rollestonfire.co.nz/cafs.htm>. (3 pages).
Peerless Pump Company, Technical Information Bulletin Number Ten, "Pump Inducers," Jul. 2006.
Porta-CAFS Compressed Air Foam System. Web page [online]. [retrieved on Feb. 8, 2010] Retrieved from the Internet <URL: http://www.firematic.com/portacafs.htm>. (2 pages).
Porta-cafs Hughes Fire Equipment. Web page [online]. [retrieved on Feb. 8, 2010] Retrieved from the Internet <URL: http://www.hughesfire.com/home/hf1/smartlist_11/Porta-Cafs>. (5 pages).
Porta-CAFS Portable Compressed Air Foam Systems, Foamblower, CAFS, Foam, etc. Web page [online]. [retrieved on Feb. 8, 2010] Retrieved from the Internet <URL: http://portacafs.com/>. (2 pages).
Rosenbauer CAFS Compressed Air Foam System. Rosenbauer International. Dated May 2005. [online] [retrieved from the Internet <http://www.rosenbauer.com>. (6 pages).
Snuffer ISO 9001 Certified FAQ About Compressed Air Foam Systems (CAFS). The Snuffer Corporation. [online] Retrieved from the Internet <http://snuffer.com/Information/PDF/FAQ.pdf>. (3 pages).
State Intellectual Property Office of the People's Republic of China, First Office Action for Chinese Patent Application No. 201380006835.1 (dated Jun. 3, 2015) (12 pages).
State Intellectual Property Office of the People's Republic of China, First Office Action for Chinese Patent Application No. 201611001741.7 (dated Apr. 17, 2019) (21 Pages).
TAM Rocket Racing Vehicles. Web page [online]. [retrieved on Feb. 8, 2010] Retrieved from the Internet <URL: http://www.tecaeromex.com/ingles/indexi.html>. (2 pages).
Uashome1. Web page [online]. [retrieved on Feb. 3, 2012] Retrieved from the Internet <URL: http://www.usaairmobile.com/insulator.htm>. (1 page).

(56) References Cited

OTHER PUBLICATIONS

Welcome to Simplex Manufacturing. Web page [online]. [retrieved on Feb. 8, 2010] Retrieved from the Internet <URL: http://www.simplexmfg.net/>. (3 pages).

Wernimont, et al. Past And Present Uses of Rocket Grade Hydrogen Peroxide. [online]. Undated but believed posted online at least as early as Oct. 7, 2007. Retrieved from the Internet <URL: http://workingthroughthebooklog.wordpress.com/2007/10/07/past-and-present-uses-of-rocket-grade-hydrogen-peroxide/>. (15 pages).

Summons to attend oral proceeding, issued in European Patent Application No. 16912824.6 on Nov. 19, 2021, 14 pp.

Technology and application of drip irrigation under the field membrane in Xinjiang, in Chinese Patent Application No. 201680088290.7 (English abstract not available) (20 pages).

\* cited by examiner

AERIAL FIRE SUPPRESSION SYSTEM

CROSS-REFERENCE TO RELATED APPLICATIONS

This application is a continuation of U.S. Non-Provisional patent application Ser. No. 15/966,937, filed on Apr. 30, 2018, which is a continuation of U.S. Non-Provisional patent application Ser. No. 15/135,880, filed on Apr. 22, 2016, which issued as U.S. Pat. No. 9,981,150, which is a continuation of U.S. Non-Provisional patent application Ser. No. 13/750,623, filed on Jan. 25, 2013, which issued as U.S. Pat. No. 9,333,379, which claims the benefit of U.S. Provisional patent application Ser. No. 61/591,791, filed on Jan. 27, 2012. These applications are incorporated herein by reference in their entirety.

BACKGROUND

This application relates generally to systems for dispensing liquids from an aerial vehicle, and particularly to fire suppression systems usable in connection with aerial vehicles, such as aircraft and rotorcraft.

The design and implementation of firefighting systems for use in airborne vehicles is a difficult endeavor at least because airborne vehicles, such as aircraft and rotorcraft (i.e., helicopters), have limited volume and payload capability, and because such systems are subject to rigorous government certification requirements to protect the safety of those flying on such vehicles as well as to protect people and property on the ground. Thus, airborne firefighting systems should be relatively small and lightweight, simple and safe to operate, with minimum impediments to government certification, while providing the longest possible endurance and the best possible effectiveness at a fire location.

Compressed Air Foam Systems (OAFS) are known in the firefighting industry for fighting fires from vehicles and platforms on the ground. Such systems include the use of a foaming agent that when combined or mixed with water, enhances the fire suppression capability of water alone. For example, when dispensed onto a fire, a water/foam mixture compared to water alone has the advantage of adhering to horizontal and vertical surfaces of a structure for long duration fire retardancy, acting as a surfactant thereby preventing re-ignition of the fire, in the case of a multi-story building, limiting water damage to the floors below the fire, and magnifying the fire suppression qualities of water by up to seven times.

Known OAFS systems for ground-based vehicles and firefighting platforms may include compressed air or inert gas injected into the water/foam mixture to aerate the water/foam mixture and to eject the water/foam mixture from a nozzle at relatively high velocities toward a relatively distant target. Compressed air or inert gas for this purpose is usually provided in the form of pressurized tanks or bottles or by one or more mechanical air compressors.

However, use of pressurized tanks or bottles or air compressors as a source for pressurized air can consume valuable space and energy resources on an airborne vehicle, are relatively heavy thereby reducing the payload available for consumable fluids such as water, foam, and fuel, and increase the risk of accidents due to the hazards associated with pressurized systems. In addition, pressurized tanks must be attached securely to an airframe, which may lengthen turnaround times when replacing depleted air tanks. Moreover, structural and weight limitations prevent pressurization of one or more water tanks carried aboard aircraft or rotorcraft where pressurized water tanks would otherwise be usable for propelling water or a water/foam mixture toward a distant target.

What is needed is a firefighting system configured for use in airborne vehicles, which overcomes the aforementioned limitations of existing CAFS systems.

SUMMARY

A fire suppression apparatus for fighting fires from a vehicle configured for flight is disclosed, comprising a fire retardant comprising a foam mixed with water, a foam proportioner for mixing the foam with the water at a selectable foam to water ratio, a gas generator for generating a gas for expelling the fire retardant from the vehicle toward a fire, the gas formed from the combustion of a fuel and an oxidizer in a combustion chamber associated with the gas generator, the combustion chamber comprising no moving parts, and an aimable boom comprising a nozzle on a distal end of the boom from which the fire retardant is dispensable toward the fire.

The foam proportioner of the fire suppression apparatus may be configured to receive the gas generated from the gas generator for injection into the fire retardant for expelling the fire retardant from the boom. The foam to water ratio of the fire suppression apparatus may range from approximately 0.1% to approximately 10.0%. The foam to water ratio of the fire suppression apparatus may range from approximately 0.4% to approximately 1.0%. The fuel and oxidizer of the fire suppression apparatus may be stored in respective fuel and oxidizer tanks on the vehicle. The oxidizer may be oxygen formed from the decomposition of hydrogen peroxide, the decomposition of hydrogen peroxide permitted while the apparatus is in flight. The fuel is selected from the group consisting of kerosene, Jet A, methanol, tetraglyme, ethanol, and methanol, furfuryl alcohol, triglyme, or dimethyl sulfoxide (DMSO).

In another embodiment, a fire suppression apparatus for fighting fires from a helicopter is disclosed, comprising a foam and water held in separate containers aboard the helicopter that when mixed forms a fire retardant, a pump driven by an electric motor, the pump including an air induction valve where air is drawn into a suction end of the pump and pressurized by the pump together with the fire retardant, and an aimable boom connected to the pump by a conduit, the boom including a nozzle on a distal end of the boom from which the pressurized fire retardant and air is dispensed toward a target.

The fire retardant may include a foam to water ratio ranging from approximately 0.1% to approximately 10.0%. Approximately 30 CFM to approximately 50 CFM of air may be pressurized with the fire retardant to approximately 125 psi by the pump. The fire retardant including the air may be expelled from the nozzle at a variable rate up to approximately 150 gpm.

The boom may be supported by a rotatable turret, which may include a first actuator for rotating the turret and a second actuator for vertically manipulating an aimpoint of the boom. The turret and the boom are programmable to automatically return to a home position upon the occurrence of an event. The event may be associated with a function of the helicopter such as a power failure. The distal end of the boom may extend beyond the tip of a rotor associated with the helicopter. The boom may dispense the pressurized fire retardant including the air at the target positioned downrange of a starboard side or a port side of the helicopter. An electronic control system may be connected to the boom to manipulate an aimpoint of the boom toward the target.

In another embodiment, a fire suppression apparatus for fighting fires from a helicopter, comprising a tank assembly attachable to the helicopter, the tank assembly supporting a foam tank for housing a foam, a water tank for housing water, and a foam pump for pumping the foam from the foam tank to the water tank to form a fire retardant, a powerpack supported on one end of the tank assembly, including a pump driven by an electric motor, the pump including an air induction valve wherein air is drawn into a suction end of the pump and pressurized by the pump together with the fire retardant, and a cannon assembly supported on an opposite side of the tank assembly, comprising a boom having a nozzle positioned at a distal end of the boom, the proximal end connected to a conduit connected to the pump for conducting the aerated fire retardant therethrough, and a rotatable turret supporting the boom, a first actuator for rotating the turret and a second actuator for moving the distal end of the boom.

The fire retardant may include a foam to water ratio ranging from approximately 0.1% to approximately 10.0%. Approximately 30 CFM to approximately 50 CFM of air may be pressurized with the fire retardant to approximately 125 psi by the pump. The fire retardant including the air may be expelled from the nozzle at a variable rate up to approximately 150 gpm.

The distal end of the boom may extend beyond the tip of a rotor associated with the helicopter. The boom may dispense the pressurized fire retardant including the air at a target positioned downrange of a starboard side or a port side of the helicopter. The cannon assembly may be controllable by a joystick to manipulate an aimpoint of the boom toward a target. The fire suppression apparatus may include an infrared vision apparatus. The fire suppression apparatus may also include a distance measuring system for identifying a relative position and/or distance of the nozzle relative to a target.

In another embodiment, a fire suppression apparatus for fighting fires from a helicopter is disclosed, comprising a tank assembly attachable to the helicopter having a foam and water held in separate containers that when mixed forms a fire retardant, a retractable pump system attached to the tank assembly or the helicopter for refilling the container associated with the water when the helicopter is in flight, a powerpack supported on one end of the tank assembly, and an aimable boom supported on an opposite end of the tank assembly and connected to the pump by a conduit, the boom including a nozzle on a distal end of the boom from which the pressurized fire retardant and air is dispensed toward a target. The retractable pump system includes a collapsible hose connected on a first end to a reversible, motorized reel for deploying and retrieving the hose, and a water pump positioned on a second end of the hose for pumping water from a water source to the container associated with the water. The powerpack includes a pump driven by an electric motor, the pump including an air induction valve wherein air is drawn into a suction end of the pump and pressurized by the pump together with the fire retardant.

The boom may be programmable to automatically return to a position alongside a fuselage of the helicopter with the distal end pointing in the direction of a nose of the helicopter upon the occurrence of an event. A joystick may be included for manipulating an aimpoint of the boom. The joystick may variably adjust a flow rate of the pressurized combination of fire retardant and air dispensed from the boom.

DETAILED DESCRIPTION

Although the figures and the instant disclosure describe one or more embodiments of a fire suppression system for aerial vehicles, one of ordinary skill in the art would appreciate that the teachings of the instant disclosure would not be limited to such systems, and instead would also have utility on ground-based platforms and on airborne platforms for use in other industries, or wherever a volume of water, water mixture, or fluid of any kind is needed to be delivered to a target at a distance from the initiating platform. In one embodiment, a system of the instant disclosure may be used to fight fires in buildings and structures of all shapes and sizes, including on high-rise buildings and oil rigs. In another embodiment, a system of the instant disclosure may be used to fight wildfires. In another embodiment, a system of the instant disclosure may be used to clean buildings of all shapes and sizes, including mosques, water towers, and high-rise buildings. In another embodiment, a system of the instant disclosure may be used to clean high tension wire insulators on electrical towers and on windmills. In another embodiment, a system of the instant disclosure can be used to deice structures, such as aircraft, windmills, power lines, and the like. In another embodiment, a system of the instant disclosure can be used to decontaminate an area, provide crowd control, or provide oil spill remediation.

Figure 1:
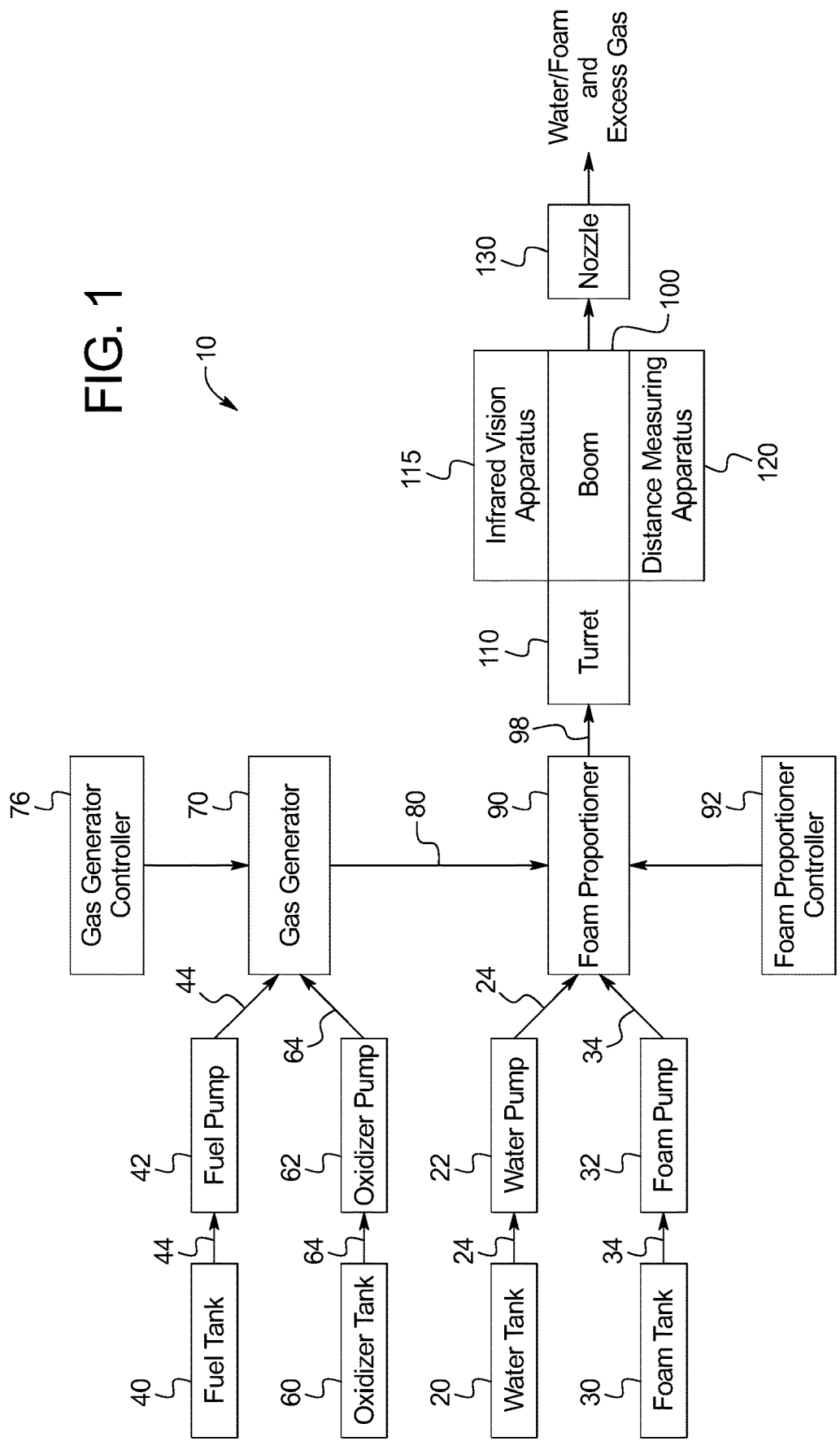
FIG. 1 is a schematic illustrating one embodiment of an aerial fire suppression system.

Turning now to the figures, wherein like reference numerals refer to like elements, FIG. 1 shows an exemplary aerial fire suppression system 10 configured for use in an aerial vehicle, such as an aircraft or a helicopter, for use in suppressing wildfires or high-rise fires, among others. System 10 comprises water tank 20 and foam tank 30 for storing water 24 and foam (or foam concentrate) 34, respectively, for use in creating a water/foam mixture for use in fighting fires. In a configuration of system 10, foam tank 30 comprises approximately 5% to approximately 10% by volume of the amount of water carried in water tank 20. A suitable foam is Phos-Chek® WD881 Class A Foam, which is available from ICL Performance Products LP of St. Louis, Mo.

Water 24 from water tank 20 and foam or foam concentrate 34 from foam tank 30 is brought together in foam proportioner 90 and mixed therein. System 10 includes water pump 22 and foam pump 32 connected to water tank 20 and foam tank 30, respectively, for drawing water 24 and foam or foam concentrate 34 from water tank 20 and foam tank 30, respectively, and for delivery of the water 24 and foam or foam concentrate 34 to foam proportioner 90 at a relatively large volumetric rate. Water pump 22 may be sized and configured to draw water 24 from water tank 20 and deliver it to foam proportioner 90 at a rate of approximately 20 to approximately 150 gallons per minute (gpm).

Foam proportioner 90 may be configured to selectively and automatically provide a desired ratio of foam to water ranging from approximately 0.1% to approximately 10.0%, and preferably from 0.4% to approximately 1.0%. Foam proportioner controller 92 connected to foam proportioner 90 provides an operator with the ability to select or otherwise input a desired foam to water ratio provided by foam proportioner 90 during operation of system 10. In one embodiment, foam proportioner 90 is configured to provide one of a number of pre-set foam to water ratios according to the water/foam coverage needs on a fire. A suitable foam proportioner 90 for system 10 is a 2000 series unit available from Pentair Water—FoamPro of New Brighton, Minn. 55112.

System 10 of FIG. 1 also shows fuel tank 40 and oxidizer tank 60 for storing a fuel and an oxidizer, respectively, onboard the aerial vehicle. Fuel 44 from fuel tank 40 and oxidizer 64 from oxidizer tank 60 may be brought together and ignited in gas generator 70 to form a substantial volume of exhaust gases 80 for injection into the water/foam mixture via foam proportioner 90. In one embodiment, exhaust gases 80 may be supplied to foam proportioner 90 at a rate of approximately 70 cubic feet per minute (CFM).

Figure 2:
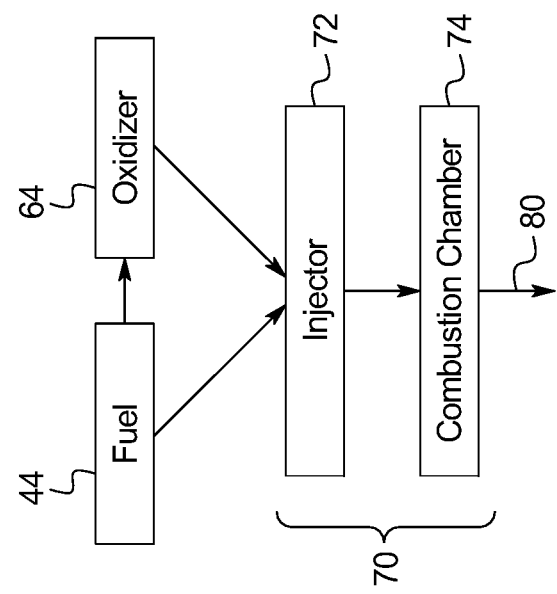
FIG. 2 is a detailed schematic of the gas generator of the embodiment of FIG. 1.

As best shown in FIG. 2, gas generator 70 may include injector 72 for receiving and injecting fuel 44 and oxidizer 64 into combustion chamber 74. To inject fuel 44 and oxidizer 64 into combustion chamber 74, injector 72 may comprise injector elements, such as injector posts, for each of fuel 44 and oxidizer 64. Injector 72 may further comprise one or more features to help achieve stable combustion of fuel 44 and oxidizer 64, such as a baffle apparatus. In one embodiment, a baffle apparatus may be formed by arranging fuel and/or oxidizer injector elements, such as injector posts, to form one or more baffles inside a fuel/oxidizer mixing zone of combustion chamber 74 to help achieve stable combustion of fuel 44 and oxidizer 64.

Depending on the characteristics of fuel 44 and oxidizer 64, fuel 44 and oxidizer 64 may spontaneously or hypergolically ignite upon contact with one another in combustion chamber 74 or may be caused to ignite using an external energy source, such as a glow plug, a spark plug, or a pyrotechnic device. In one embodiment, fuel 44 and oxidizer 64 exist in liquid form, but either may be used in any combination of solids, liquids or gases or hybrids of these without departing from the scope or principles of the instant disclosure.

Gas generator controller 76 is connected to gas generator 70 for monitoring and automatically adjusting the mixture ratio of fuel 44 to oxidizer 64 by opening and closing one or more fuel and/or oxidizer valves. Gas generator controller 76 may be configured to monitor and control characteristics of the combustion process, such as temperatures, pressures and composition of combustion products, and the gas flow rate and delivery of exhaust gases 80 to foam proportioner 90. Gas generator controller 76 may be configured to automatically and safely terminate the combustion process upon the occurrence of an event, such as the receipt of a signal corresponding to low fuel or oxidizer levels or of a signal or a command, such as one initiated by an operator or as a result of a sensor reading, by automatically closing the one or more fuel and/or oxidizer valves in a predetermined sequence, timing, and rate to cease delivery of fuel 44 and/or oxidizer 64 to gas generator 70. Gas generator controller 76 may be configured for open loop or closed loop control of these elements and functions. In one embodiment, gas generator controller 76 is configured to automatically terminate the combustion process upon loss of vehicle electrical power, as may occur as a result of an in-flight shutdown of one or more flight-sustaining engines of the aerial vehicle or the shutdown of one or more onboard engines or auxiliary power units (APU's). System 10 can be configured to automatically reconfigure itself into a "safe" mode to cease dispensing the water/foam mixture, to cease combustion in gas generator 70, and to stow boom 100 (discussed below) to minimize workload of the occupants of the vehicle in the event of, for example, an emergency involving the aerial vehicle.

Turning again to FIG. 1, system 10 may include fuel pump 42 and oxidizer pump 62 connected to fuel tank 40 and oxidizer tank 60, respectively, for drawing fuel 44 and oxidizer 64 from fuel tank 40 and oxidizer tank 60, respectively, and delivery of fuel 44 and oxidizer 64 to gas generator 70 at a relatively large volumetric rate. Fuel 44 and/or oxidizer 64 may alternatively be gravity fed or pressure fed to gas generator 70 if, for example, fuel tank 40 and/or oxidizer tank 60 are either pressurized or are configured for gravity delivery of the fluids from therein.

In situations where a foam proportioner is not needed or desired, foam or foam concentrate 34 may alternatively be premixed with water 24 at a predetermined ratio to form a batch, which may be carried onboard the aerial vehicle in a water/foam tank. In this situation, exhaust gases 80 may be brought together and mixed with a flow of the water/foam mixture to propel the water/foam/gas mixture from boom 100 toward a target.

Upon exiting foam proportioner 90, the mixed water/foam/exhaust gas mixture 98 is then delivered to boom 100 and dispensed from boom 100 via nozzle 130 toward the aim point of boom 100. Exhaust gases 80 aid in the formation of bubbles in boom 100 and increase the distance at which the water/foam mixture is discharged from nozzle 130. Boom 100 may incorporate lightweight materials and geometry uniquely suited to permit a relatively lengthy boom 100 while providing a flow rate of fluids therefrom sufficient to suppress a fire located a substantial distance away from the vehicle. For example, boom 100 may be configured from one or more pieces and may be constructed of a composite material to provide sufficient rigidity to withstand excessive bending or deflection along its length, especially in the presence of, for example, rotor downwash when installed on a helicopter.

Boom 100 may also be configured to extend beyond the rotor tip diameter of a helicopter, for example, to avoid undesirable, pre-dispersion or atomization of the water/foam mixture. In one embodiment, boom 100 is approximately 6.7 to 7.3 meters long and extends at least approximately 1 meter past the rotor tip. At least the distal end of boom 100 may be constructed of one or more materials that provide electrical insulating properties to prevent the conduction and transmission of electricity should boom 100 be used in or near electrical power lines, for example, such as when fighting fires situated in close proximity to electrical power lines or when cleaning power line insulators on electrical power line towers. Besides composite materials, boom 100 may be constructed from other materials that provide the foregoing and other desirable properties and functionality, including wound carbon fiber and fiberglass, matt resin, and aluminum, among others. In view of its length beyond the rotor tip, boom 100 may be formed into a relatively light yet strong and deflection resistant structure to avoid excessive shifting of the center of gravity of the aerial vehicle and to avoid deflection of the distal tip of boom 100 into the path of the rotor blades.

Boom 100 may be constructed to permit its telescoping extension and retraction to, for example, provide compact stowage during ground operations and during flight while also providing the ability to position the distal end of nozzle 130 beyond the rotor tip while in use and on station at the location of a fire. Boom 100 may alternatively be constructed as a fixed length.

Boom 100 may be configured to operate in a "wet" configuration or in a "dry" configuration. For operation in a "wet" configuration, the working fluid, such as a water/foam mixture, is communicated through boom 100 to nozzle 130 and "wets" the internal surfaces of boom 100. By contrast, boom 100 may be configured in a "dry" configuration in which an internal hose communicates the working fluid therein to nozzle 130. A "dry" configuration involving an internal hose may not easily allow boom 100 to also be of a telescoping configuration, whereas boom 100 having a "wet" configuration coupled with a telescoping configuration may lead to binding of or leakage through telescoping elements of boom 100.

System 10 may be configured to include two or more of booms 100 for dispensing fluids at multiple aim points or for increasing the volume and/or rate of dispensed fluids from a single aerial vehicle. The one or more booms 100 may be deployed toward the side of the aerial vehicle or toward the front of the aerial vehicle. Sideward deployment of boom 100 may reduce pilot workload if a dedicated operator of system 10 is located on the aerial vehicle or is remotely operating system 10 thereby allowing the pilot to fly the vehicle while also improving the firefighters' ability to target the fire independent of vehicle movement. Sideward deployment helps the pilot position and orient the vehicle to obtain optimum flight characteristics, and facilitates use of emergency escape routes because the vehicle is pointing away from the fire, potentially in the direction of intended travel. By contrast, forward deployment of boom 100 in a rotorcraft can negatively impact rotorcraft stability because a tail wind may be created by the consumption of air by the fire.

System 10 may be configured to deliver the water/foam mixture from nozzle 130 at relatively low pressure but at relatively high volumes to suppress a fire downrange. The pressure for low pressure configurations of system 10 may range from approximately 50 to approximately 200 pounds per square inch (psi), depending on how far downrange the water/foam mixture or other fluid is desired to be delivered. In one embodiment, system 10 is configured to deliver the water/foam mixture from nozzle 130 at approximately 125 psi at a flow rate of approximately 150 gpm to a distance of approximately 132 feet from nozzle 130, which corresponds to approximately 150 feet from the proximal end of boom 100 if boom 100 is approximately 7 meters long. In this way, system 10 may be used to suppress fires at a significant distance from the firefighting platform, including buildings located in urban areas, such as high rise buildings and warehouses. In another one embodiment, system 10 is configured to deliver the water/foam mixture from nozzle 130 at approximately 125 psi at a flow rate of approximately 20 gpm to a distance of approximately 65 feet from nozzle 130.

System 10 may alternatively be configured to provide relatively low volumes of fluid at relatively high pressure to, for example, be used for pinpoint cleaning of insulators on electrical high tension wire towers, for cleaning windmills and the like, or for deicing structures, vehicles and the like. In one embodiment, system 10 may be configured for cleaning of high tension wire insulators to deliver a fluid from nozzle 130 at approximately 1500 psi to provide approximately 5.5 to approximately 6.0 gpm to a distance of approximately 12 to approximately 14 feet from nozzle 130, which exceeds the distance currently provided by known cleaning systems of approximately 3 to approximately 6 feet from a nozzle.

In one embodiment, system 10 includes a winch driven, manually operated, boom system with handlebars for manually guiding boom 100 left, right, up, and down. Springs 111 and/or hydraulic or pneumatic cylinders may assist an operator of boom 100 to move boom 100 vertically. In another embodiment, instead of the manually operated, winch driven boom system, system 10 may include turret 110 to permit powered or power assisted manipulation of boom 100 both vertically and horizontally.

An operator, whether it is the pilot, an onboard operator, or a remotely located operator, may manipulate the aim point of boom 100 using, for example, a joy stick. In another embodiment, the operator may manipulate the aim point of boom 100 using a set of handlebars, a steering wheel or any other known steering apparatus to steer boom 100 toward an aim point. As shown in FIG. 1, boom 100 may be connected to turret 110, which may or may not include a drive system for altogether moving or at least assisting the movement of boom 100 as directed by an operator. If turret 110 includes a drive system, turret 110 may additionally be configured to stow boom 100 in a "home position" when not in use to enhance the safe operation of the aerial vehicle during flight operations and to permit, for example, easy and safe ingress and egress to and from the location of the fire.

Linear and rotary actuators may be programmed to control the direction and speed of movement of boom 100 and turret 110, respectively, via the joy stick or other steering apparatus. Compound (diagonal) movement of boom 100 may be achieved by engaging the linear and rotary actuators simultaneously, perhaps at different rates. In one embodiment, rotational movement of boom 100 may range from pointing approximately toward the nose of the aerial vehicle (i.e., forward) for stowage during transit of the aerial vehicle, to approximately 110 degrees aft during fire suppression operations. In an embodiment for rotorcraft implementations, vertical movement of boom 100 may range from approximately level (to avoid interference with the rotor) to approximately 40 degrees downward. For aircraft implementations, vertical motion of boom 100 may range from approximately horizontally to approximately 40 degrees downward. A mechanical or an electromechanical lock may be implemented to stow boom 100 for stowage for transit of the vehicle. One or more position sensors may be employed to provide one or more signals corresponding to the position of boom 100. The one or more signals may be used to disengage or engage one or more of the linear and rotary actuators, and thereby movement, of boom 100.

Figure 4:
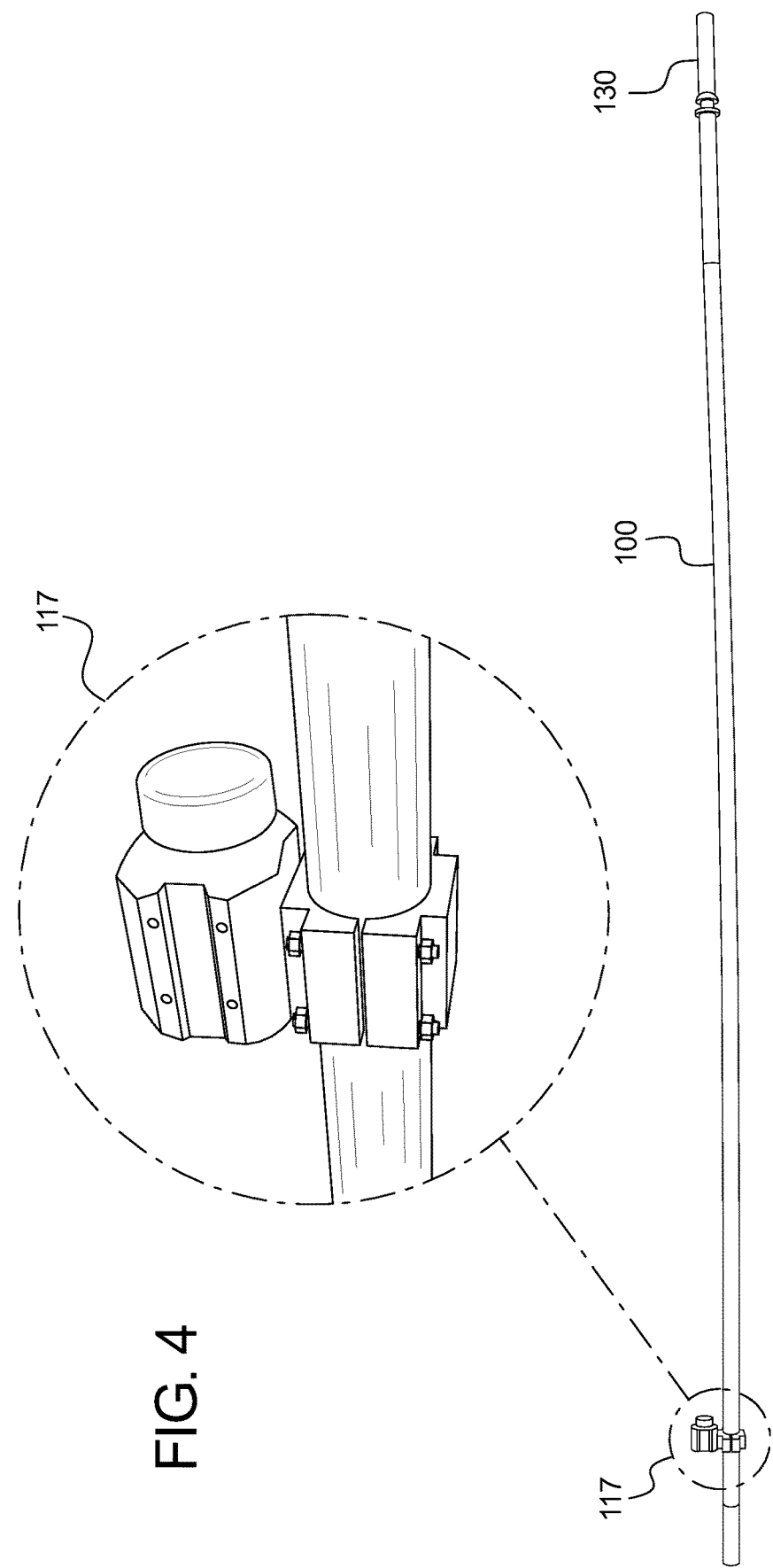
FIG. 4 illustrates an exemplary infrared camera mounted on a boom of an exemplary aerial fire suppression system.

In one or more embodiments, system 10 may include infrared vision apparatus 115, distance measuring apparatus 120 comprising a laser for determining the distance between the aerial vehicle and any obstructions or buildings, and an anti-cavitation device in water tank 20 for minimizing the chances of drawing air rather than water 24 from water tank 20 by water pump 22. Infrared vision apparatus 115 may comprise infrared camera 117, such as the EVS3 9 Hz infrared camera available from FLIR Systems, Inc. of Goleta, Calif. 93117, to help identify fire hot spots through fog, dust, and smoke and in total darkness. In one embodiment, as shown in FIG. 4, infrared camera 117 may be mounted on boom 100. In another embodiment, infrared camera 117 may be mounted elsewhere on a component of system 10 or on a component of the aerial vehicle. In one embodiment, imagery from one or a multiple of infrared cameras 117 may be fed to display 160 mounted on or near turret 110 to be viewed by an operator of turret 110. Alternatively, imagery from one or a multiple of infrared cameras 117 of system 10 may be fed to multiple displays in real-time. Such displays may include a display in the cockpit for the pilot, a display on a helmet mounted vision system worn by the pilot or by one or more crew members or operators of system 10 onboard the aerial vehicle, a display located remotely from the aerial vehicle either on the ground or in another aerial vehicle, and a display associated with any number of handheld devices, including cellular phones or computer tablet devices.

Figure 3:
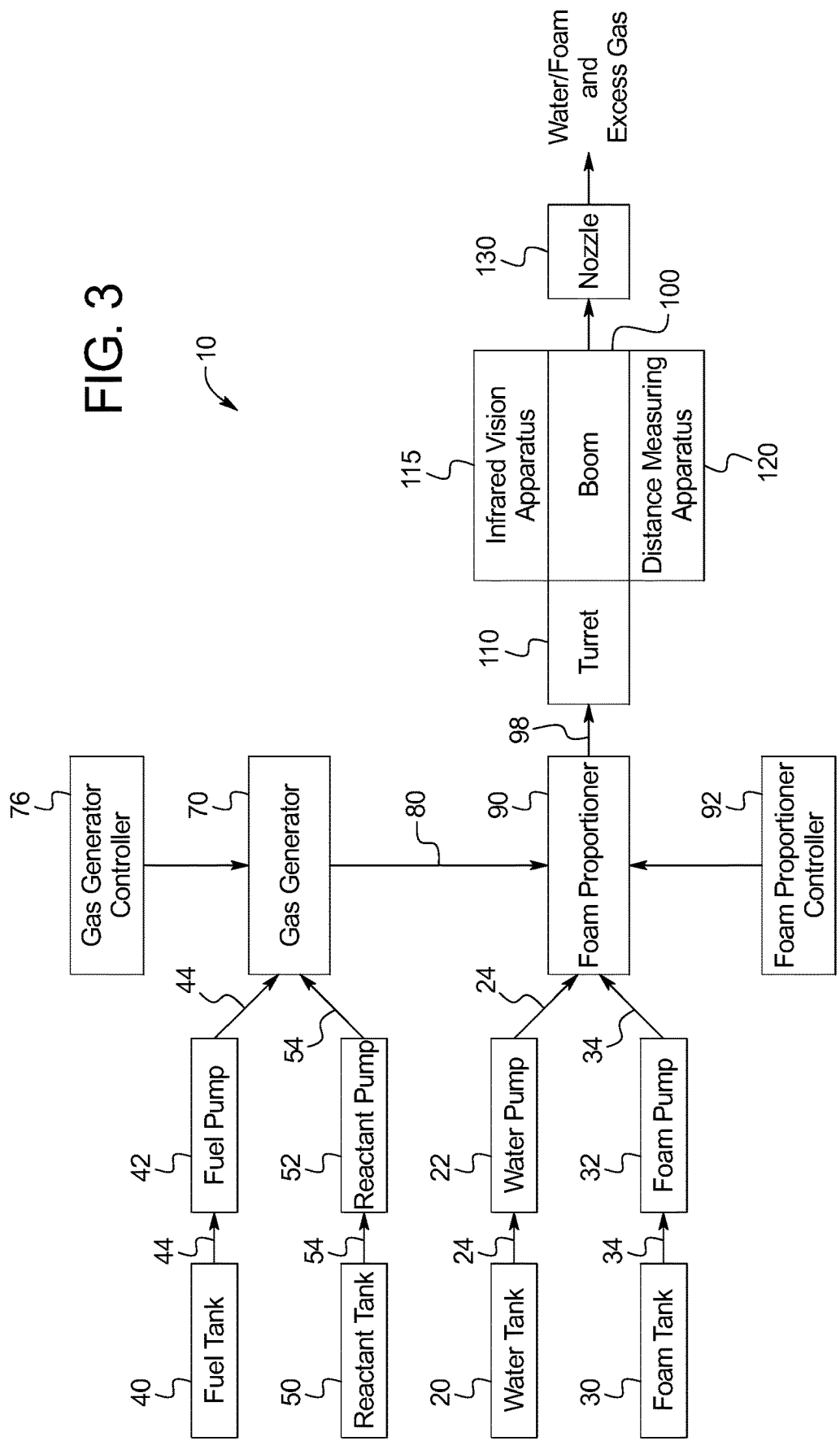
FIG. 3 is a schematic illustrating an alternative embodiment of an aerial fire suppression system.

Turning to FIG. 3 there is shown an alternative embodiment for system 10. In particular, system 10 of FIG. 3 includes reactant tank 50 for storing reactant 54 therein. In one embodiment, reactant 54 comprises hydrogen peroxide, which when allowed to decompose in the presence of a catalyst, such as silver, forms steam and gaseous oxygen. The oxygen may then be combined with fuel 44 in gas generator 70 whereupon fuel 44 is ignited in combustion chamber 74 to form exhaust gases 80. Exhaust gases 80 comprising a relatively high volume of gas on the order of approximately 70 CFM may be fed into foam proportioner 90 whereupon the water/foam/gas mixture 98 may thereafter be delivered to boom 100 and ultimately dispensed from nozzle 130 upon a distant target.

As a reactant, hydrogen peroxide may range in purity from approximately 90% to approximately 50%. In one embodiment, the decomposition of reactant 54 occurs in a reaction tank downstream of reactant tank 50 but upstream of gas generator 70. Pressure relief valves may be placed on tanks and on fluid or gas lines wherever pressure needs to be released automatically for purposes of maintaining a proper margin of safety of system 10.

Fuel 44 may be one of kerosene, Jet A, methanol, tetraglyme, ethanol, methanol, furfuryl alcohol, triglyme, or dimethyl sulfoxide (DMSO). Depending on the characteristics of the reactant, a suitable catalyst to help speed the decomposition reaction and therefore production of the oxidizer may be from the group consisting of manganese acetate tetrahydrate, sodium borohydride, ferrous chloride, silver (colloidal), silver salts, potassium permanganate, and sodium permanganate. In one embodiment, system 10 includes a relatively safe, non-toxic or very low toxicity fuel, reactant and/or oxidizer, and exhaust gases to promote relatively safe handling and/or operation and require minimal personnel protection.

Figure 5:
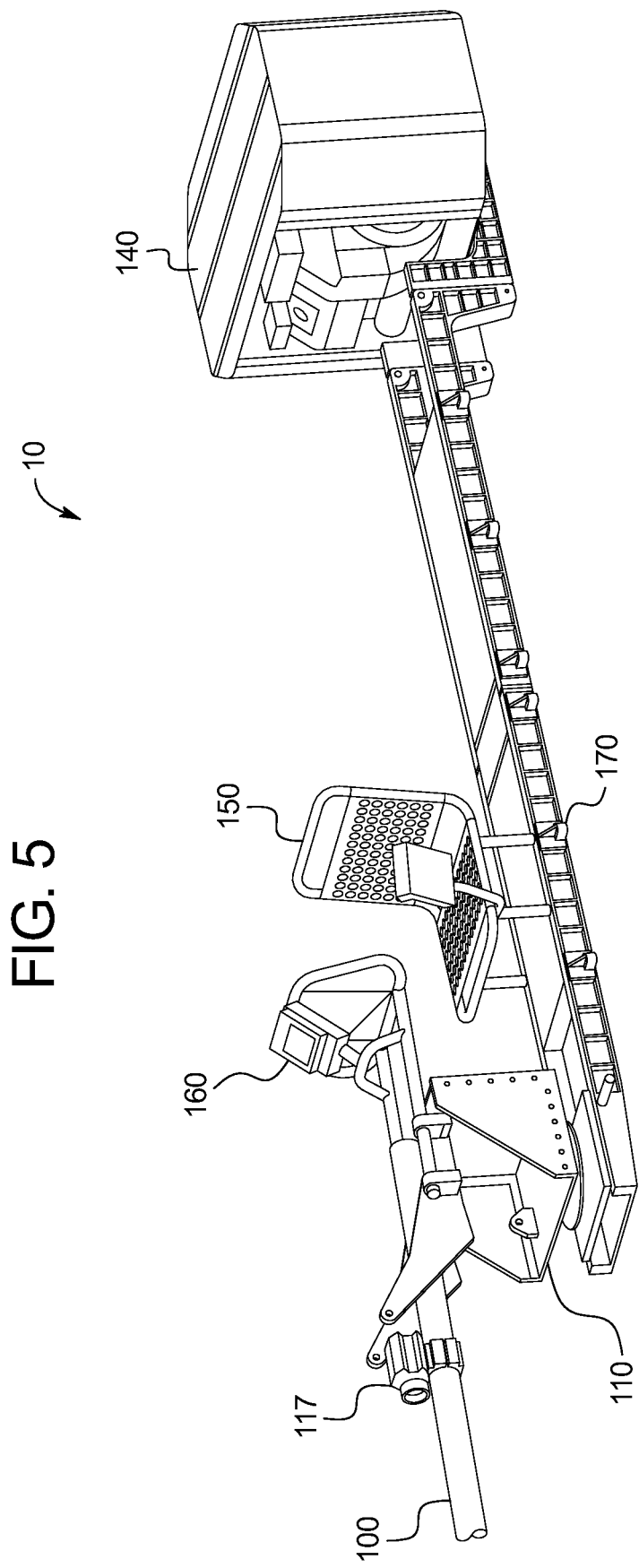
FIG. 5 illustrates a detailed perspective view of a portion of an exemplary aerial fire suppression system.

Turning to FIG. 5, there is shown a detailed view of a portion of an exemplary system 10. For example, there is shown turret 110, which as described above, may include a manually operated or a power assisted or powered configuration. Also shown is boom 100, with infrared camera 117 of infrared vision apparatus 115, which can provide an image to a display, such as display 160, as described above. Also shown is chair 150 to permit an operator onboard the vehicle to direct the aim point of boom 100. Further shown is powerpack 140, which can be configured to counterbalance turret 110 and boom 100 when extending out the side of the aircraft or rotorcraft, can provide lateral stability and control of the aerial vehicle when in service. Powerpack 140 may include, for example, gas generator 70, foam proportioner 90, one or more of the pumps described above, or any other article carried by the aerial vehicle that may assist powerpack 140 in providing the counterbalancing function. FIG. 5 shows an exemplary rail system 170 for mounting turret 110, chair 150, and powerpack 140 onto an aerial vehicle.

Electrical power to operate system 10, including turret 110 and boom 100, may be derived from a nonessential electrical bus of the aerial vehicle, from an electrical generator connected to the engine or transmission of the aerial vehicle, or from an auxiliary power unit (APU). All of the fluid pumps described above may be electrically driven using electrical power from the sources noted above, or may be mechanically driven through mechanical links to onboard engines, or may be turbine driven using a portion of exhaust gases 80 to drive one or more turbine wheels connected to one or more impellers or inducers of the pumps, or a combination of any of these methods.

One or more of the pumps described above, namely fuel pump 42, oxidizer pump 62, water pump 22 and foam pump 32 and reactant pump 52 may be powered either mechanically or electrically from the aircraft or rotorcraft systems. For example, fuel pump 42 may be configured as an electric pump that draws electrical current from a nonessential main electrical bus of the aircraft or rotorcraft, or from a generator connected either to the rotor or engine system, or from a separate auxiliary power unit (APU). Foam proportioner 90, turret 110, foam proportioner controller 92, and gas generator controller 76 may all be powered in the same way.

Figure 7:
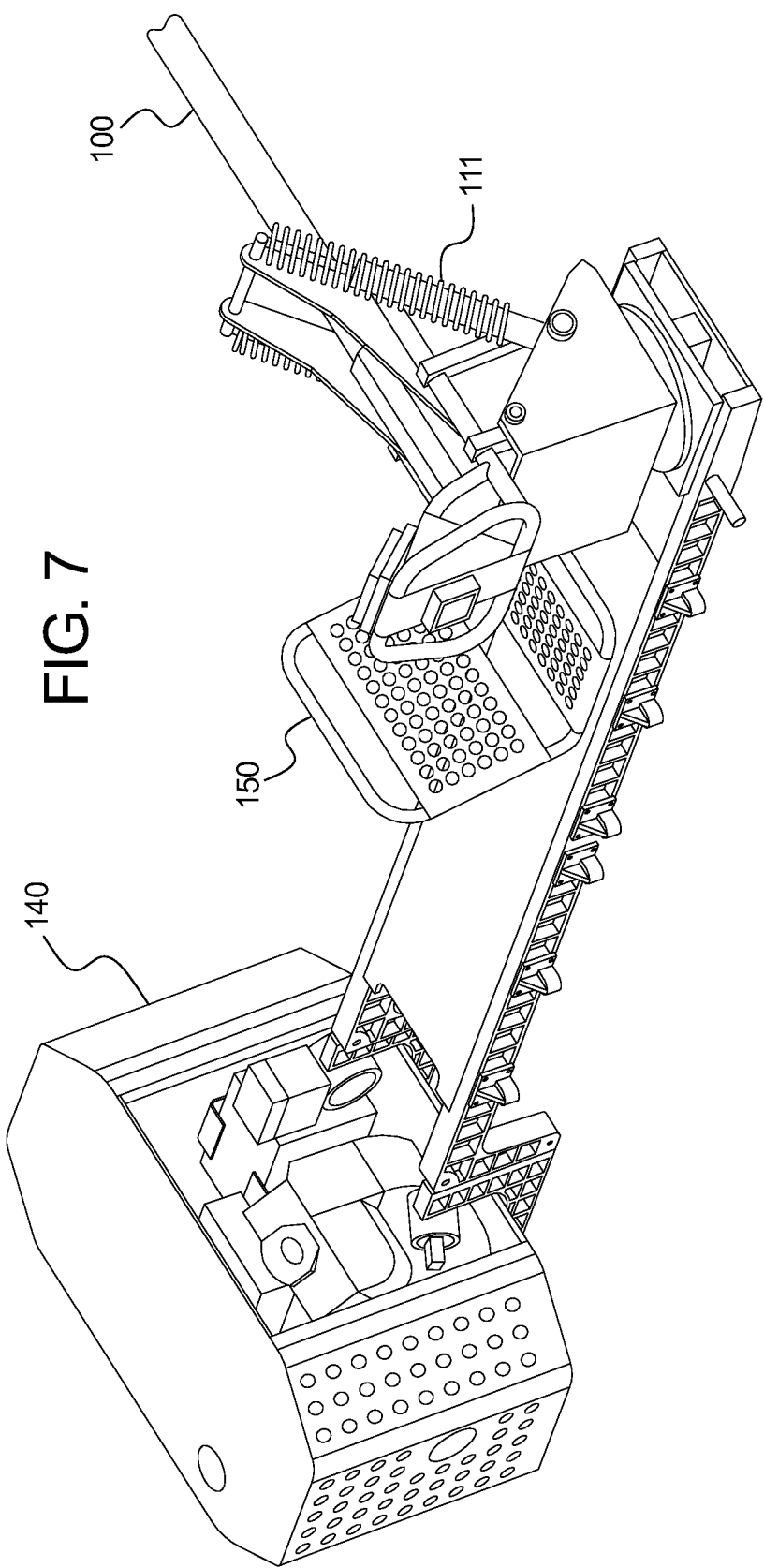
FIG. 7 illustrates a detailed perspective view of a portion of an exemplary aerial fire suppression system.
Figure 8:
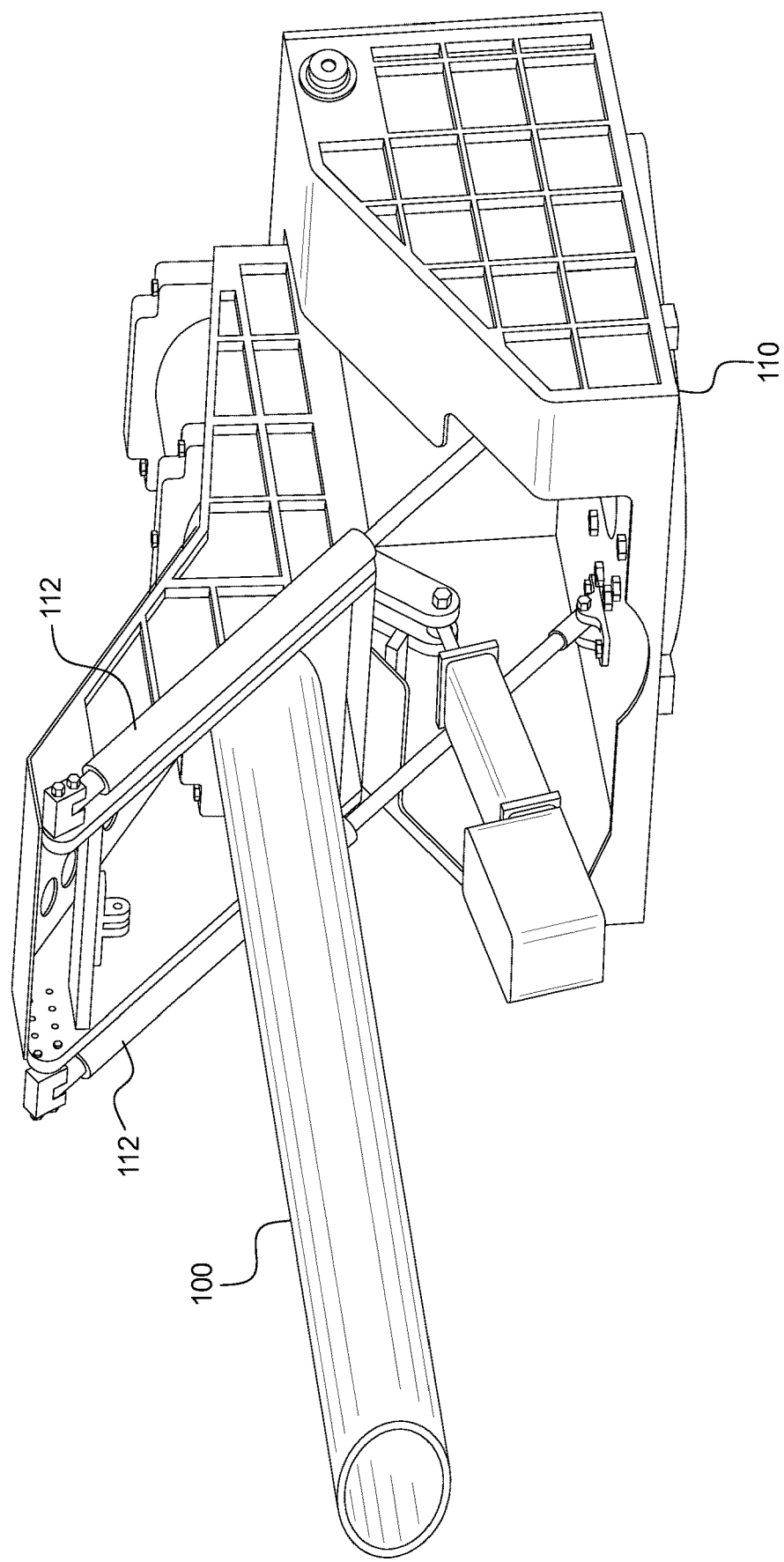
FIG. 8 illustrates a detailed perspective view of a portion of an exemplary aerial fire suppression system.

A battery may be configured as a backup electrical power supply to boom 100 and to turret 110 to enable system 10 to automatically stow, or the pilot, onboard operator, or remote operator to manually stow, boom 100 in a safe, forward-projecting configuration for egress of the air vehicle on-station and for landing of the air vehicle should the air vehicle or system 10 otherwise lose electrical power. As shown in FIG. 7, an alternative embodiment of turret 110 includes return springs 111 for assisting a boom operator with vertical movement of boom 100 and to return boom 100 to the horizontal position when not manually commanded by the boom operator. As shown in FIG. 8, an embodiment of turret 110 includes gas struts 112, which may provide a fail-safe return of boom 100 to the horizontal position should the vehicle lose power when boom 100 is under manual, power assisted, or powered control by the boom operator.

Figure 6:
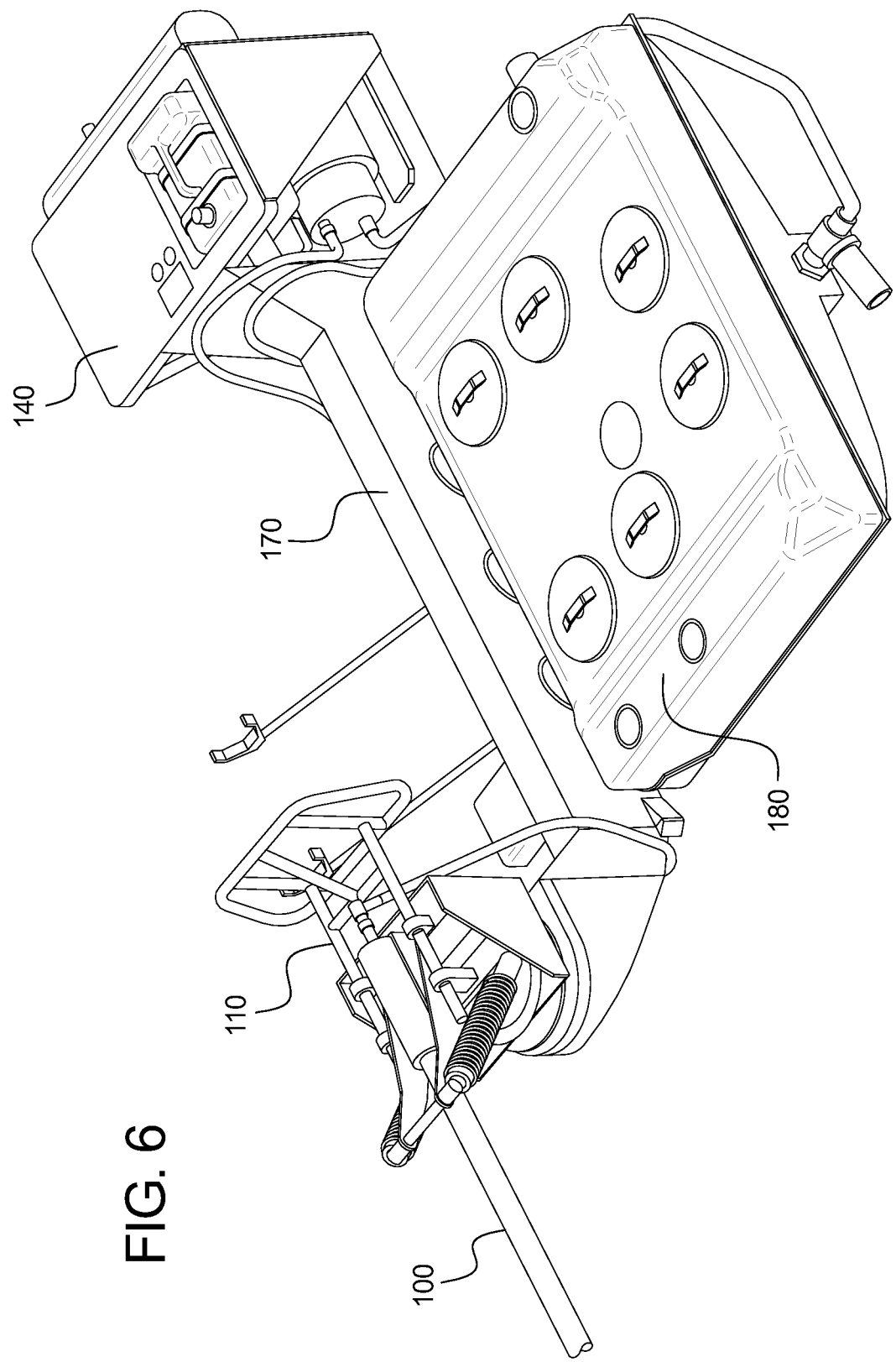
FIG. 6 illustrates an exemplary tank assembly of an exemplary aerial fire suppression system.

Turning to FIG. 6, tanks 20, 30, 40, 50 and 60 may be mounted externally to the aerial vehicle as part of tank assembly 180. Tanks 40, 50 and/or 60 may alternatively be mounted in powerpack 140, leaving only tanks 20 and 30 mountable in tank assembly 180 or in a separate structure. All of these tanks may be internally mounted to the aerial vehicle but doing so may limit multi-mission capability and flexibility by consuming valuable internal volume of the vehicle. Foam tank 30 may comprise a bladder for enabling an aerial vehicle to drop fire retardant vertically when needed, such as on wildfires or on warehouse building fires or whenever horizontal delivery of retardant is not needed. The bladder may be housed internally to water tank 20.

Although not shown on the figures, system 10 may include piping for communication of fluids and gases to and from various elements of system 10, valves, including pressure relief valves, temperature, pressure, and position sensors, flow meters, and controllers. System 10 may include other, similar elements without departing from the scope or principles of the instant disclosure.

In addition, the aerial vehicle may include retractable or nonretractable refill systems configured for use on rotorcraft or fixed wing aircraft. In an embodiment including a rotorcraft, refill cycle times while hovering over a water source, such as a reservoir or a lake, may range from approximately 25 seconds to approximately 60 seconds to reload water tank 20 with water. In an embodiment, foam refilling may be required after approximately 5 to approximately 10 water cycles depending upon the ratio of foam to water used.

In an embodiment, fuel tank 40 and oxidizer tank 60 may each comprise approximately 2.0 gallons to approximately 3.0 gallons of fluid while foam tank 30 may comprise approximately 36 gallons of foam 34 and water tank 20 may comprise approximately 600 gallons of water 24 that is refillable using an inflight refilling system, the combination providing approximately one hour of water/foam fire retardant dispensed with exhaust gases 80 during normal use of system 10, which approximately coincides with approximately 60 minutes of available fuel (plus 30 minutes of reserve fuel) that a rotorcraft may carry on a single mission to power the vehicle for flight.

In one embodiment, fuel tank 40, oxidizer tank 60 (or reactant tank 50) may be swapped and replaced, and foam tank 30 may be refilled, on the order of a few minutes by ground personnel by employing quick-disconnects for all pipe interconnects to other elements of system 10. System 10 can therefore dramatically improve on-station endurance and utility, and minimize periods of downtime, by the firefighting platform.

Figure 9:
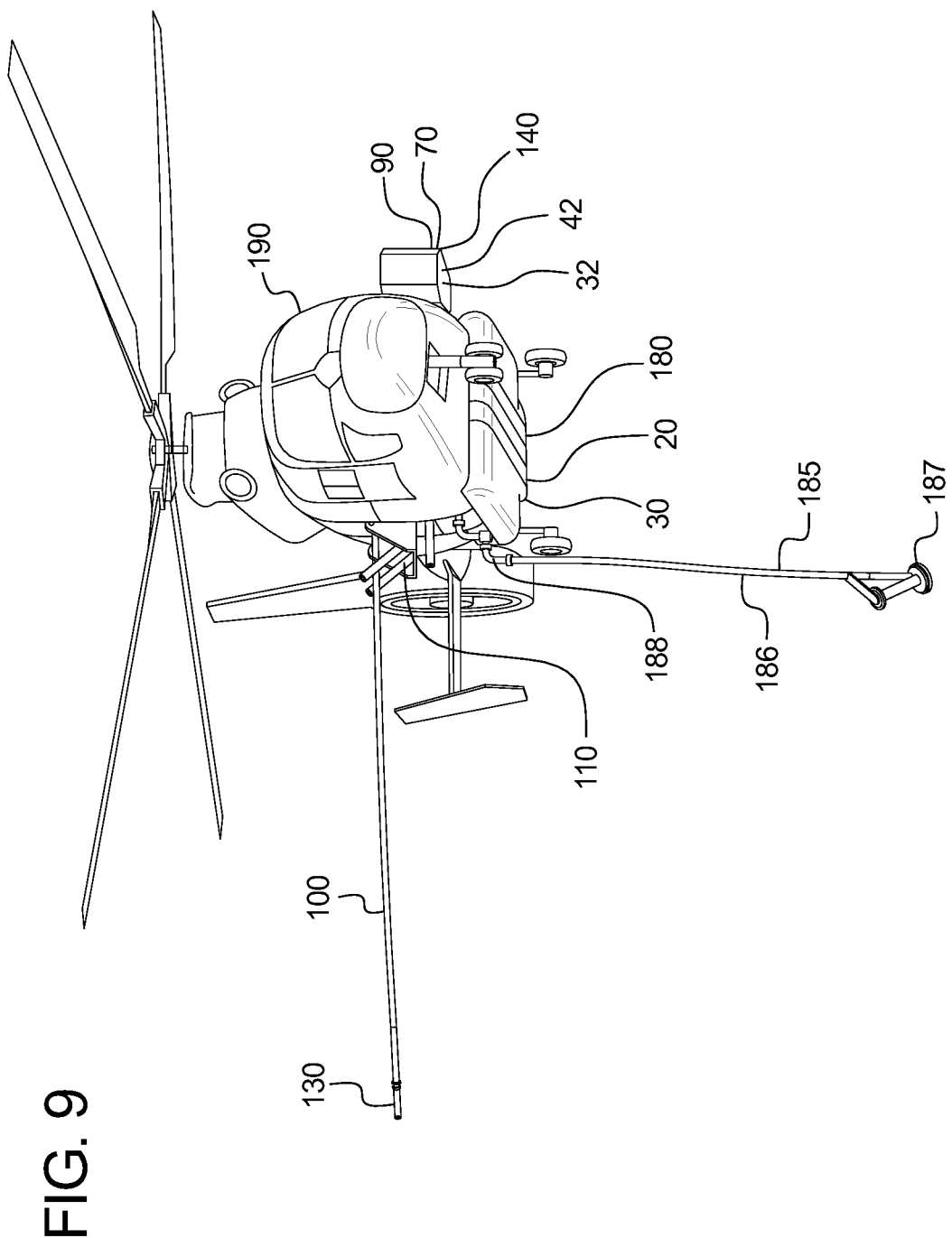
FIG. 9 illustrates an exemplary aerial fire suppression system in use.
Figure 10:
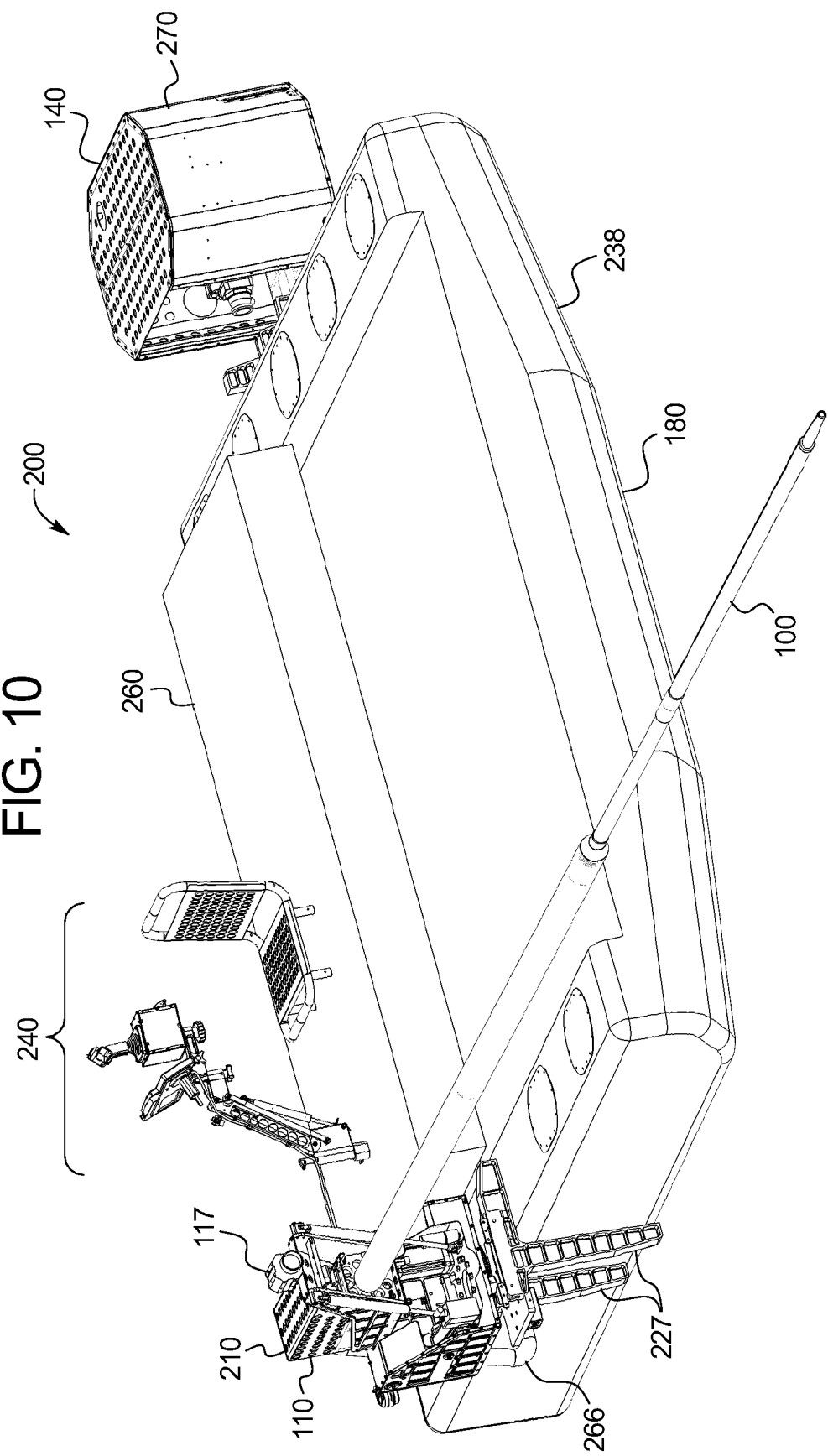
FIG. 10 illustrates a right front perspective view of another embodiment of an aerial fire suppression system.
Figure 11:
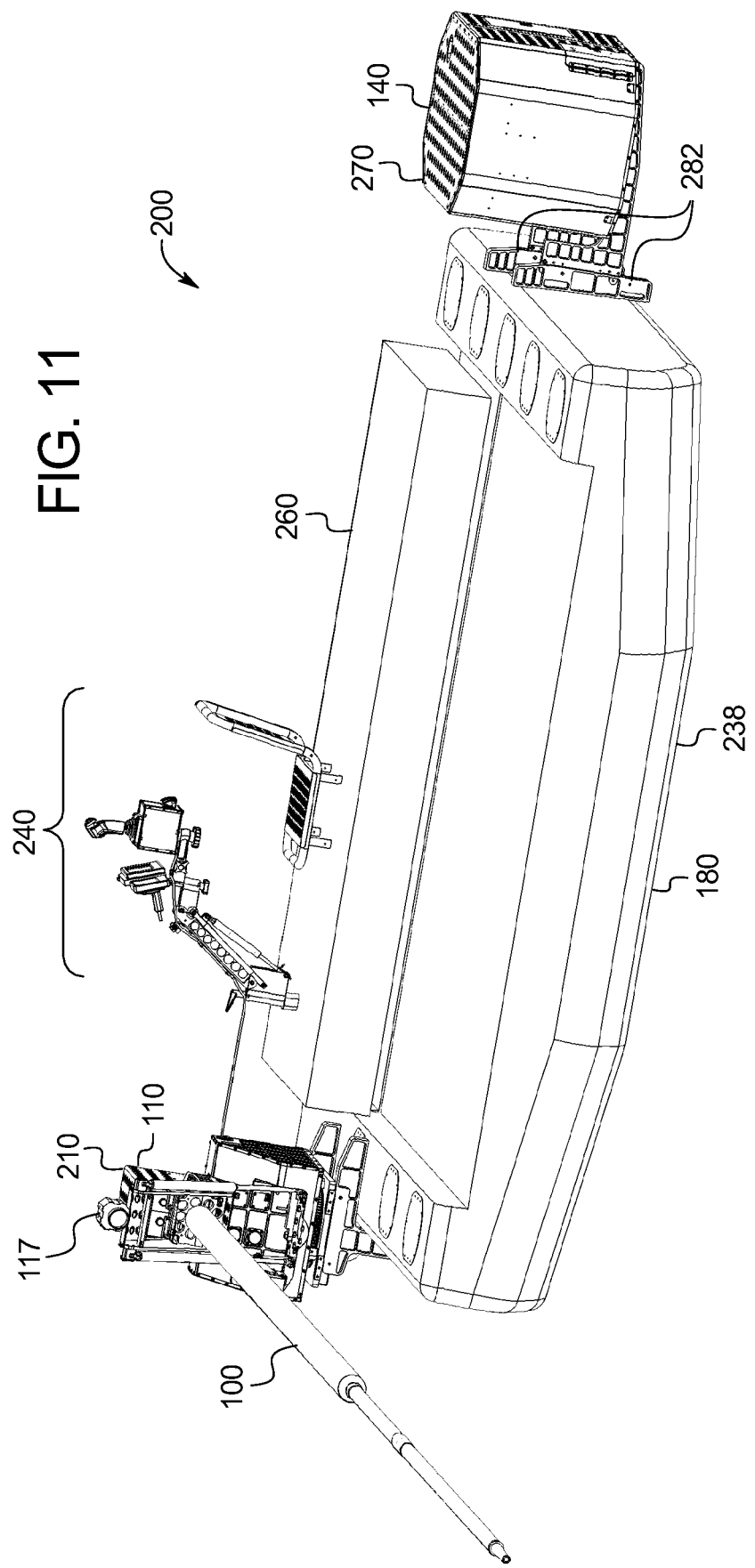
FIG. 11 illustrates a left front perspective view of the embodiment of FIG. 10.
Figure 12:
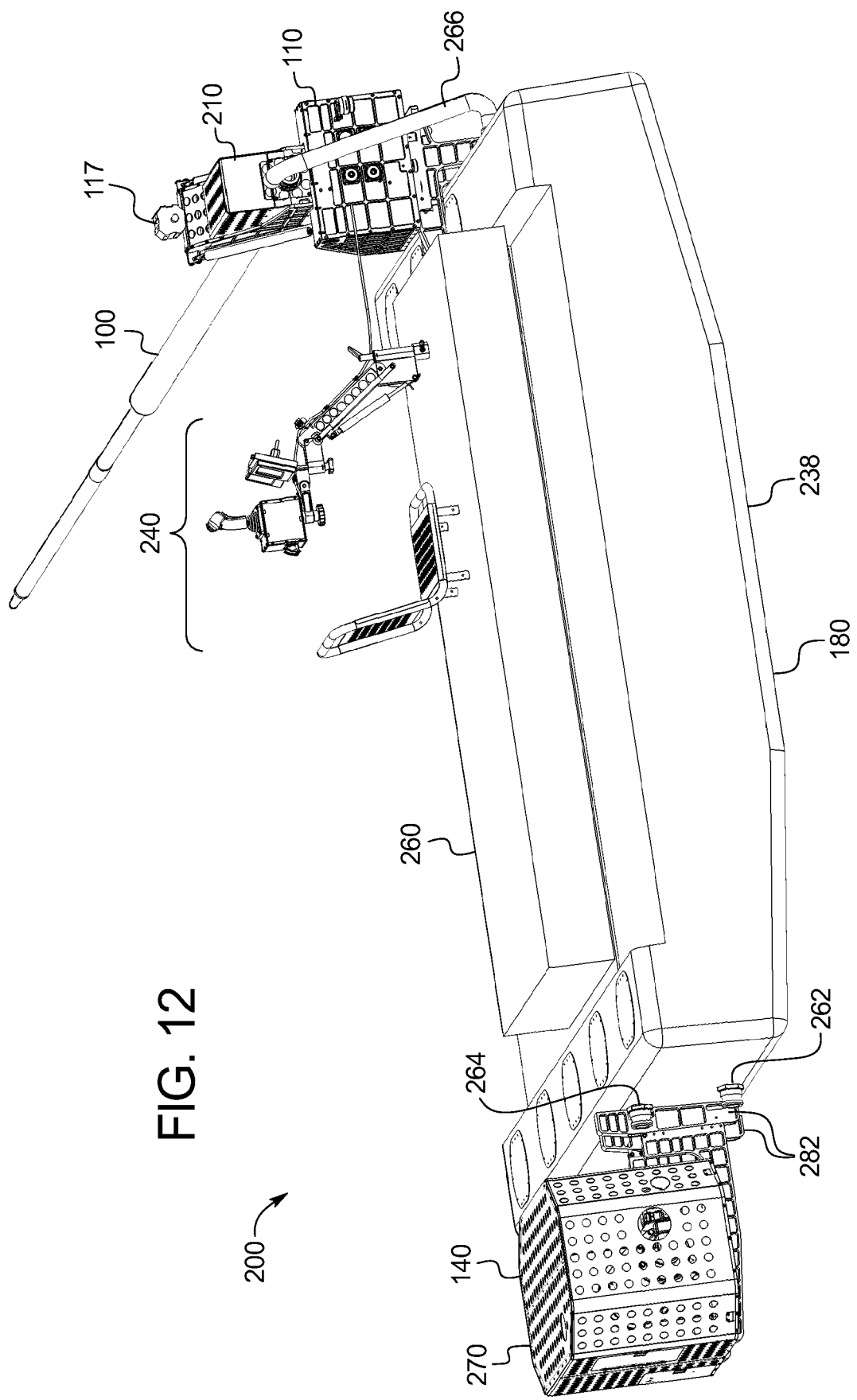
FIG. 12 illustrates a left rear perspective view of the embodiment of FIG. 10.
Figure 13:
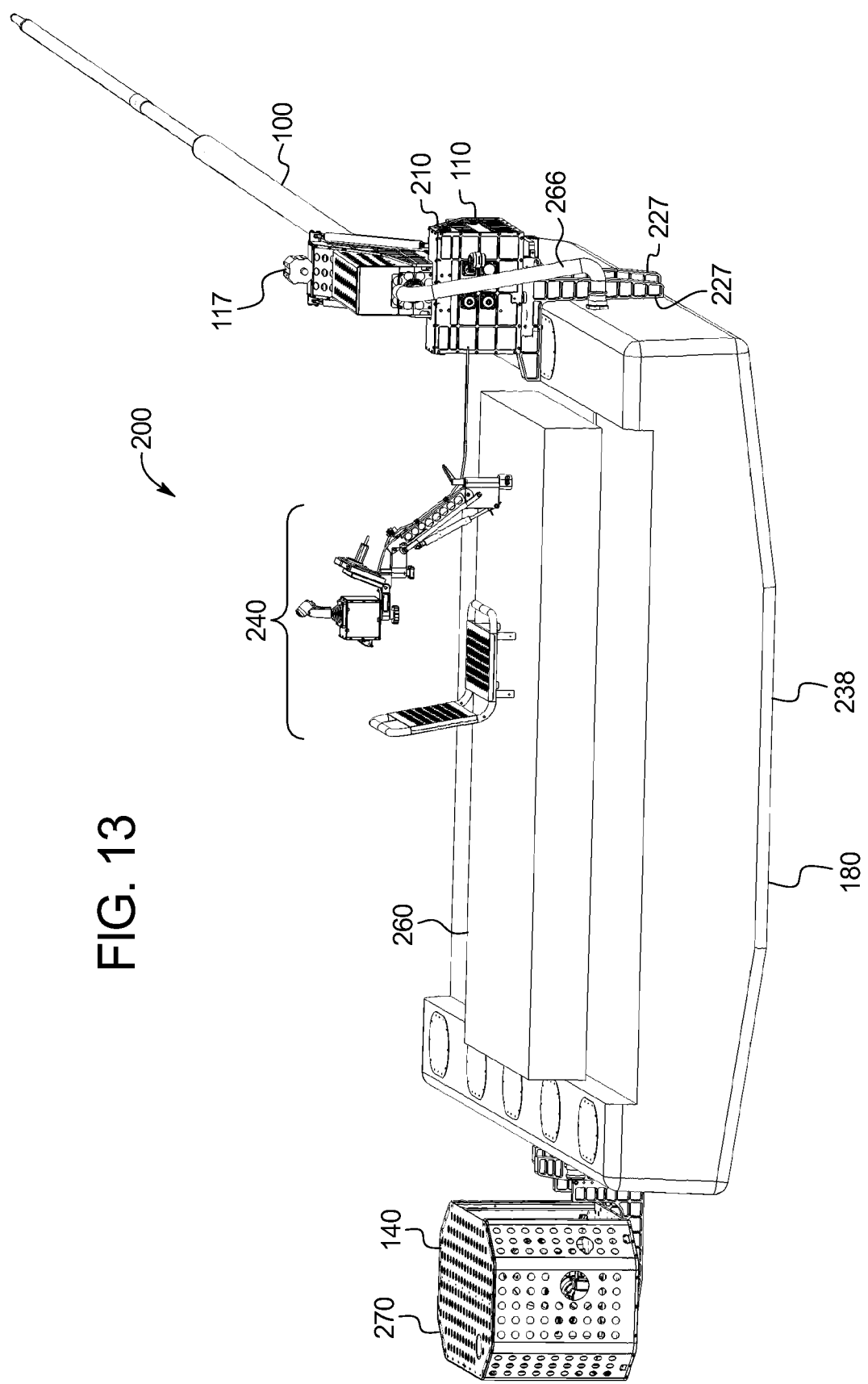
FIG. 13 illustrates a right rear perspective view of the embodiment of FIG. 10.
Figure 14:
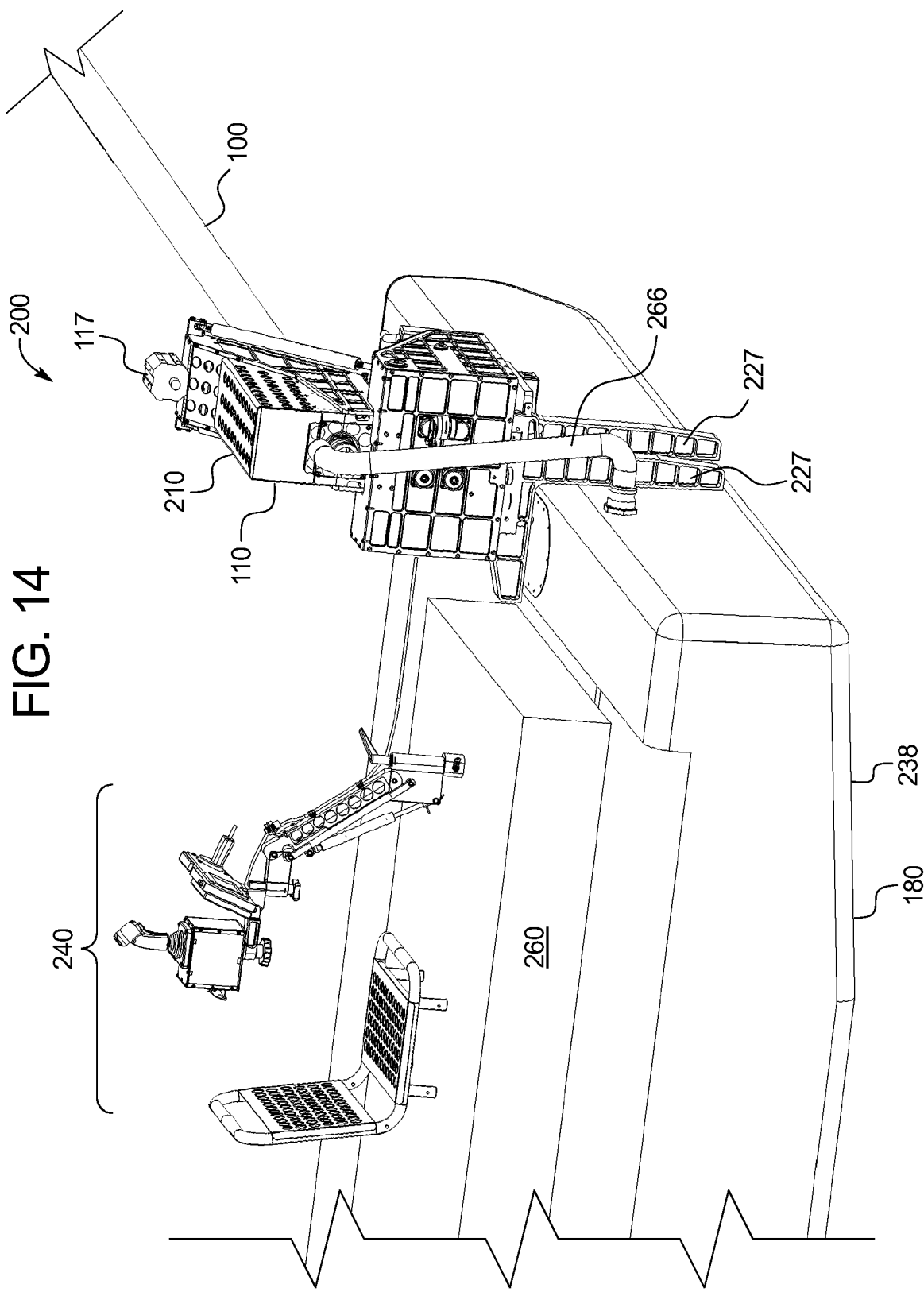
FIG. 14 illustrates a partial detailed right rear perspective view of the embodiment of FIG. 10.

Turning to FIG. 9 there is shown an exemplary system 10 attached to helicopter 190 for fighting a fire in a high rise building. In this depiction, boom 100 is shown being oriented approximately 90 degrees clockwise from the nose of helicopter 190. With the vehicle already pointing in a potential direction of travel, quick and automatic stowage of boom 100 in the forward position permits easy egress of helicopter 190 from the firefighting station should an emergency involving the aerial vehicle occur. FIG. 9 also shows hover pump system 185 to replenish water tank 20 with water from a water source, such as a reservoir, pond, lake, and the like while helicopter 190 hovers overhead the water source. As shown, hover pump system 185 includes water pump 187 located at the distal end of hose or conduit 186 for submersion into the water source, and rotatable elbow 188 to permit helicopter 190 land while hover pump system 185 is installed thereto.

Referring now to FIGS. 10-14, there is shown system 200 configured for use in an aerial vehicle, such as an aircraft or a helicopter, for use in suppressing wildfires or high-rise fires, among others. System 200 includes many of the same or similar features and functionality as described above for system 10, but incorporates different approaches, as described more fully below, to generate and utilize gas aboard an aerial vehicle for injection into the water/foam mixture for delivery by boom 100 toward a target.

System 200 includes tank assembly 180, powerpack 140, cannon assembly 210, operator station 240, as well as various plumbing, wiring, fittings, and supports to interconnect the foregoing. Cannon assembly 210 and powerpack 140 are both supported by tank assembly 180, which is configured for mounting externally to the fuselage of an aerial vehicle. Cannon assembly 210 is mounted on one side of tank assembly 180 while powerpack 140 is mounted to an opposite side of tank assembly 180. In this way, the weight of cannon assembly 210 may be counterbalanced by the weight of powerpack 140 and because cannon assembly 210 and powerpack 140 are both mounted to tank assembly 180 rather than to the air frame or fuselage of the aerial vehicle itself, system 200 provides easier integration with a variety of air frames. In other embodiments, cannon assembly 210 and/or powerpack 140 may be mounted instead directly to the airframe of the aerial vehicle. In the embodiment shown in FIGS. 12-14, operator station 240 is mounted to platform 260 or floor of the aerial vehicle. In other embodiments, operator station 240 may be mounted on a rail, such as rail system 170 described above.

Tank assembly 180 is configured to house or support water tank 20, foam tank 30, and foam pump 32, as well as system plumbing and conduit, baffles, sensors, interfaces, interconnects, and the like. For example, tank assembly 180 includes interface 262 and associated plumbing connected thereto for communicating water/foam solution 182 from water tank 20 to water/foam pump 290 of powerpack 140, and interface 264 and associated plumbing connected thereto for receiving water/foam solution 182 discharged from water/foam pump 290 and communicating water/foam solution 182 to flexible conduit 266 and ultimately to boom 100 for discharge toward a target.

Tank assembly 180 may also include an anti-cavitation device 21 mounted inside water tank 20 at the lowest point of tank 20 to permit water/foam pump 290 to withdraw water/foam solution 182 without cavitating water/foam pump 290. In the case of a helicopter, the lowest point in tank 20 may arise when the helicopter is in hover mode.

Figure 15:
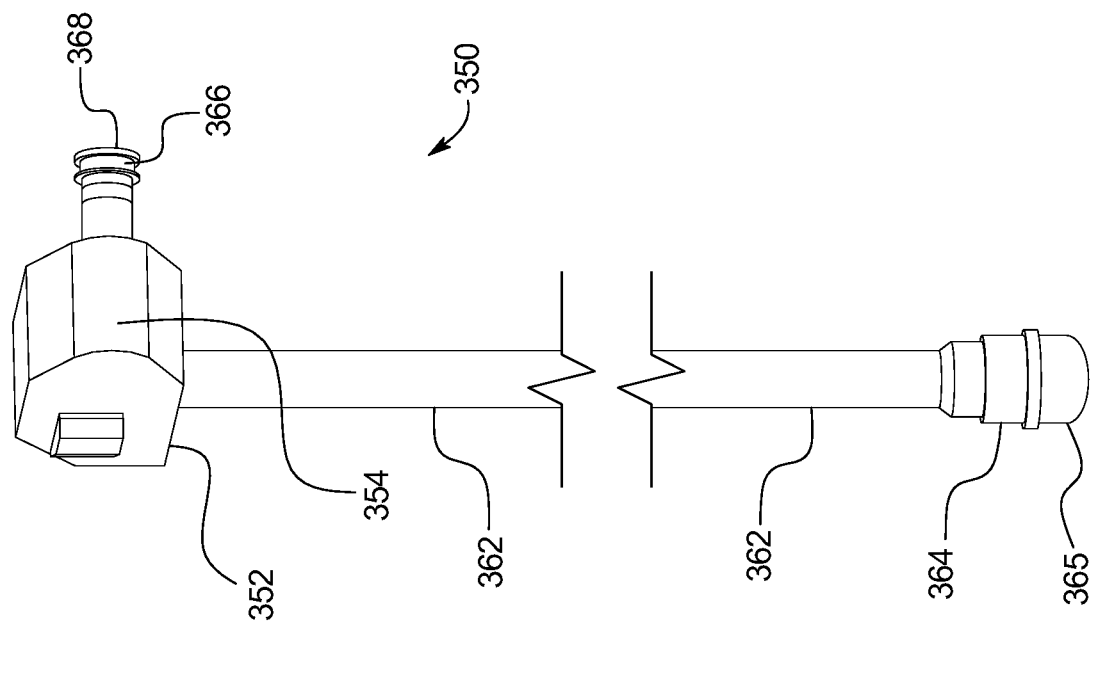
FIG. 15 illustrates a perspective view of an exemplary retractable pump system usable in connection with an embodiment of an aerial fire suppression system.
Figure 16:
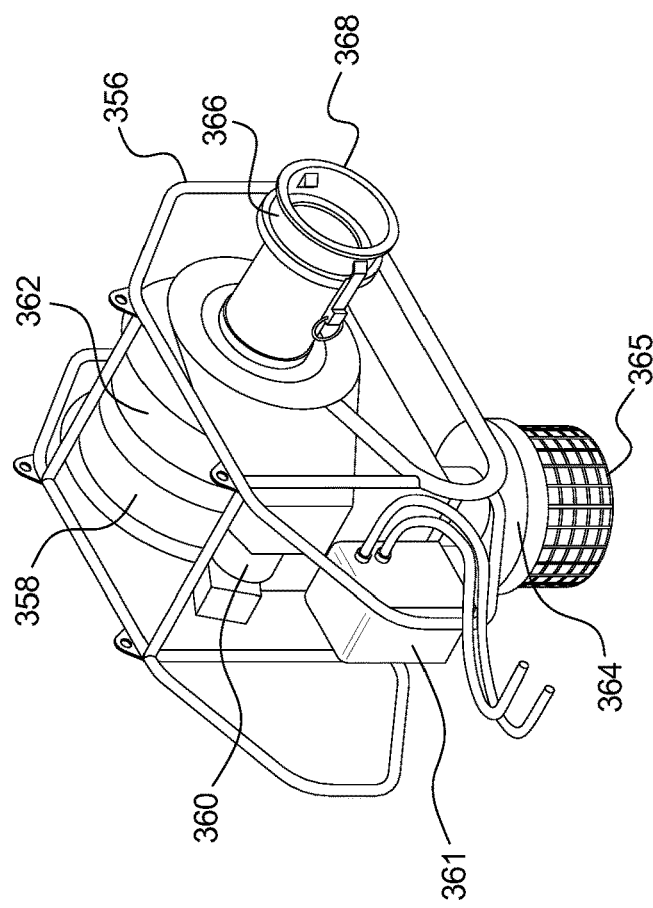
FIG. 16 illustrates a partial front perspective view of the retractable pump system shown in FIG. 15.
Figure 17:
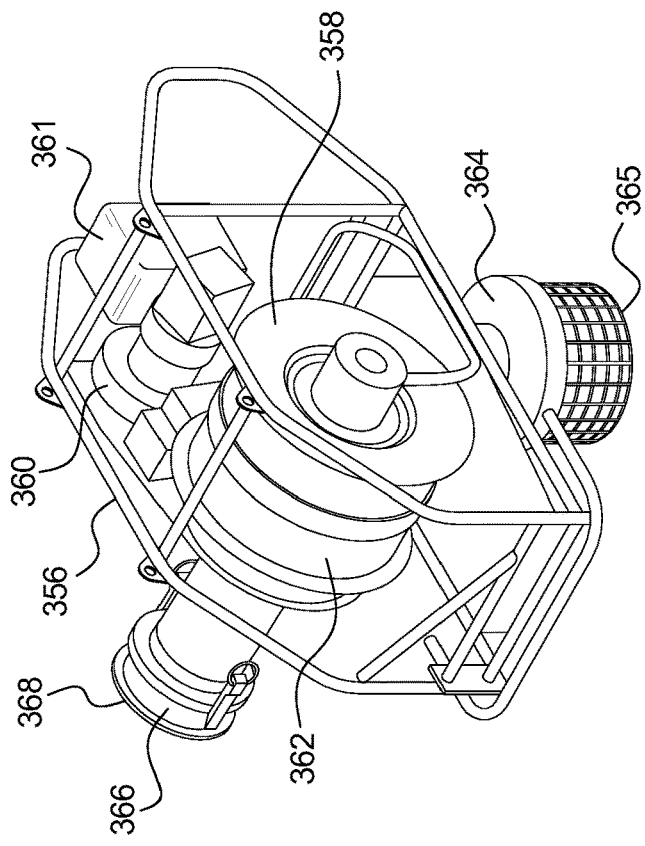
FIG. 17 illustrates a partial rear perspective view of the retractable pump system shown in FIG. 15.

As shown in FIGS. 15-17, tank assembly 180 may additionally be configured to interface with retractable pump system 350 for deploying and retracting a collapsible, flexible hose to draw water from a water source, such as a pond or lake, into water tank 20 while the aerial vehicle is hovering over the water source. In one embodiment, retractable pump system 350 includes housing 352 for supporting motorized reel 358 and reversible motor 360, and motor controller 361, for deploying or retracting collapsible hose 362. Housing 352 may include panels 354 fastened to cage elements 356 to form the structure of housing 352. On the distal end of collapsible hose 362 is pump 364, the inlet of which is covered by screen 365, for pumping water from the water source to water tank 20. Retractable pump system 350 may be mounted to the aerial vehicle or to a side of tank assembly 180 to conduct water from collapsible hose 362 to water tank 20 via conduit 366.

Retractable pump system 350 is controllable from a pilot of the aerial vehicle or from an operator located at operator station 240. During operation, reversible motor 360 of retractable pump system 350 may be commanded by the operator, which command is received by motor controller 361, which in turn, energizes reversible motor 360 to cause rotation of reel 358 in the desired direction to either wind and retract, or unwind and deploy, collapsible hose 360 to or from reel 358. Once pump 364 is submerged in a water source following deployment of collapsible hose 362 from reel 358, the operator may turn pump 364 "on" to pump water from the water source to water tank 20 via collapsible hose 362, internally through the hub of reel 358, and via conduit 366. Interface 368 of conduit 366 may be mounted to a wall or interface associated with water tank 20 to communicate water to water tank 20. Conduit 366 may alternatively be adapted to connect with additional plumbing, which in turn, is connected to water tank 20 to communicate the water to water tank 20. Upon completion of the filling cycle, the operator may command pump 364 to its "off" position to cease pumping water. The operator may then command reversible motor 360 to cause counter-rotation of reel 358 to retract collapsible hose 362 and to wind collapsible hose 362 onto reel 358. Deployment and retraction of collapsible hose 362 may be initiated while the aerial vehicle is hovering, or in transition to and from hover, respectively, over the water source. One or more of the steps of deploying collapsible hose 362 to, for example, a predetermined length, turning on and off pump 364 for pumping of water, and retracting collapsible hose 362 may be automatically performed using sensors and/or appropriate software control algorithms incorporated into system 200. When collapsible hose 362 is fully wound on reel 358, retractable pump system 350 does not interfere with normal landing operations for the aerial vehicle.

Figure 18:
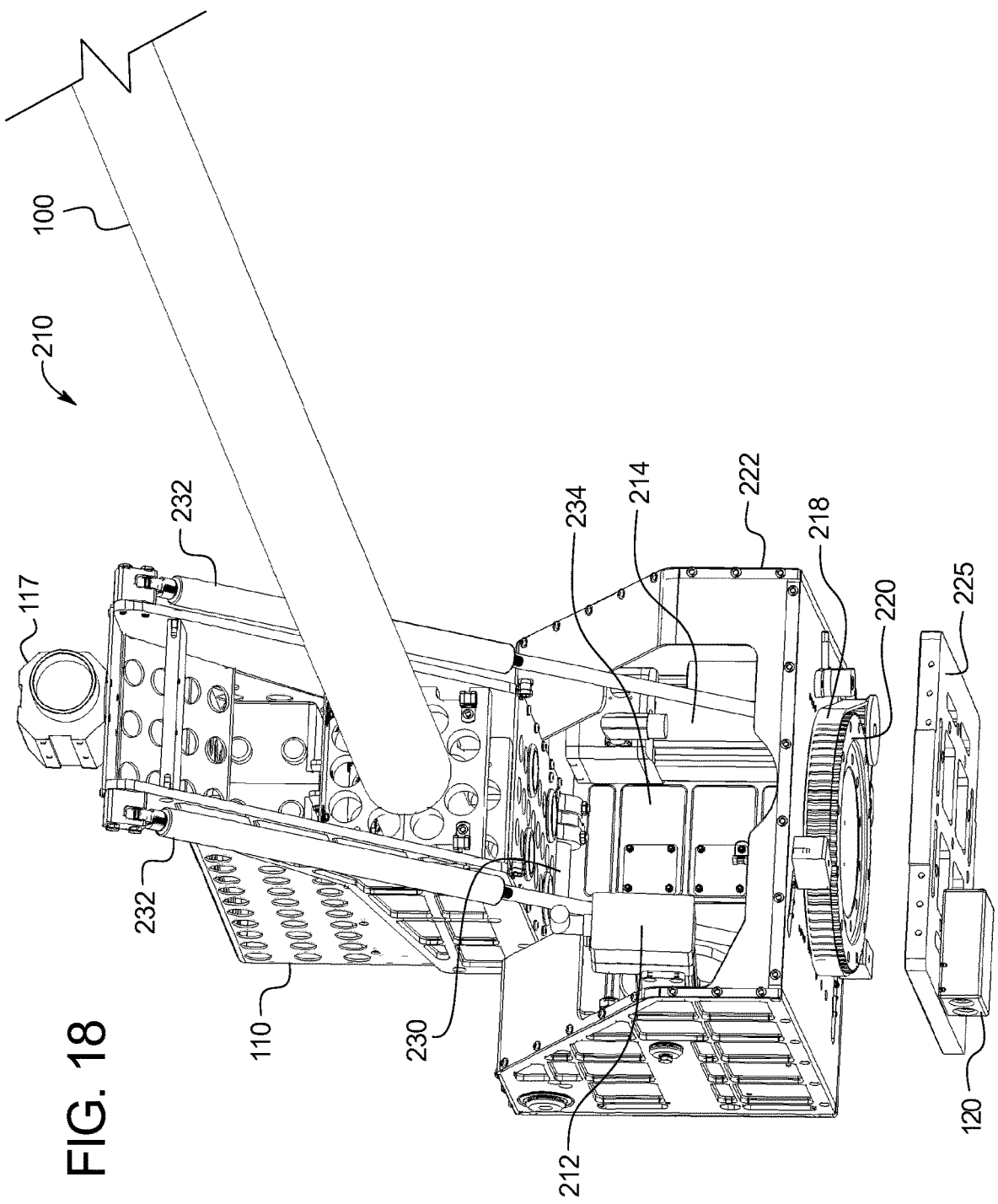
FIG. 18 illustrates a partially exploded perspective view of the cannon assembly shown in FIG. 10.

Cannon assembly 210 of system 200 includes turret 110, boom 100 having nozzle 130 at a distal end, and optionally, infrared vision apparatus 115 and distance measuring apparatus 120. As shown in FIG. 18, turret 110 of system 200 includes linear actuator 212 and rotary actuator 214 that may be programmed to control the direction and speed of movement of boom 100 and turret 110, respectively, via joystick 250 (see, e.g., FIG. 19). Turret 110 includes base 225, which in turn, is supported by supports 227 (see, e.g., FIG. 18) for supporting and mounting cannon assembly 210 to tank assembly 180.

Base 225 includes stationary gear 220 for receiving gear belt 218, which in turn, is connected to rotary actuator 214 for rotating turret 110 along a generally vertical axis to cause boom to move horizontally. Turret 110 includes a bearing (not shown) upon which housing 222 and the remainder of turret 110 is supported. Consequently, when rotary actuator 214 engages gear belt 218, housing 222 and the remainder of turret 110 rotates in the direction of travel of rotary actuator 214 relative to base 225.

To move boom 100 vertically, linear actuator 212 is connected to pivot arm 230, which in turn, is connected to boom 100. Compound (diagonal) movement of boom 100 may be achieved by engaging linear actuator 212 and rotary actuator 214 simultaneously, perhaps at different rates. Gas springs 232 are connected to boom 100 to assist linear actuator 212 to return boom 100 to the horizontal position, such as in the event of a power failure. Battery 234 is configured to supply backup power to turret 110 to enable system 200 to automatically stow, allowing the pilot, onboard operator, or remote operator to manually stow, boom 100 in a safe, forward-projecting configuration for egress of the air vehicle on-station and for landing of the air vehicle should the air vehicle or system 200 otherwise lose electrical power.

As previously described, infrared vision apparatus 115 including infrared camera 117 may be mounted on boom 100 or elsewhere on turret 110. Likewise, distance measuring apparatus 120 comprising a laser for determining the distance between the aerial vehicle and any obstructions or buildings, is shown mounted on base 225, but could be mounted on any structure of system 200 or on the aerial vehicle itself.

Figure 19:
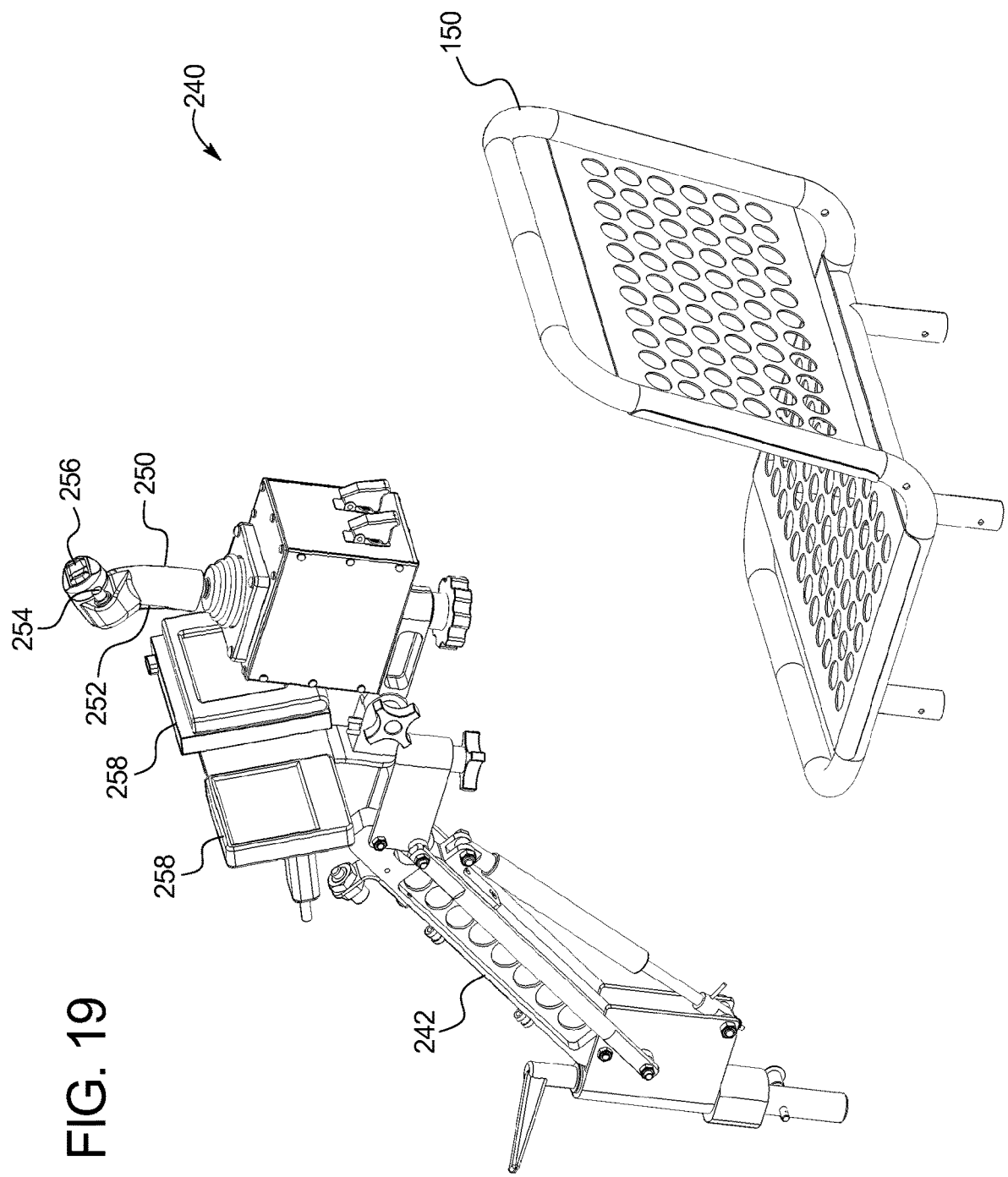
FIG. 19 illustrates a perspective view of the operator station shown in FIG. 10.

Turning to FIG. 19, operator station 240 is shown as including chair 150 for an operator of cannon assembly 210 and a group of controls and computer displays mounted on adjustable arm 242. The operator may manipulate the aim point of boom 100 using, for example, a joystick 250. Joystick 250 is electrically connected to linear actuator 212 and rotary actuator 214 to provide horizontal, vertical, and diagonal movement of turret 110. Joystick 250 also includes a number of controls to activate or deactivate various aspects of cannon assembly 210. For example, joystick 250 shown in FIG. 19 includes trigger 252, which is connected to one or more valves or solenoids to turn on, turn off, or vary the flow of water 24, water/foam solution 182, or water/foam/gas mixture 98 delivered by boom 100 toward a target. Joystick 250 also includes button 254 that is connected through a solenoid for releasing turret 110 from a locked and/or stowed position. Joystick 250 further includes rocker switch 256 for turning on or turning off gas flow from gas generator 274. One of ordinary skill would appreciate that other means for turning on or turning off various aspects of system 200 may be used other than buttons, switches, and the like, such as a software-driven user interface deployed on a touch screen, as described below.

Operator station 240 also includes controls to permit an operator to, for example, turn on, turn off, or vary the flow of foam from foam tank 30 to water tank 20 via foam pump 32. Operator station 240 may also have controls for varying the concentration of foam or foam concentrate to achieve a desired concentration of foam in water tank 20.

Also mounted on adjustable arm 242 is one or more displays 258 for displaying information and for providing an interface for an operator to control one or more aspects of system 200. By way of example, displays 258 may report data from infrared vision apparatus 115, distance measuring apparatus 120, position and movement data of boom 100, flow rate, quantities, and quantity remaining of consumable fluids and gases, data regarding the computed time remaining on-station, alert information including data and/or messages indicating one or more operating parameters of cannon assembly 210 falling outside pre-determined limits, data related to atmospheric conditions such as wind direction and speed, temperature, humidity, and barometric pressure, and data relating to altitude, attitude and other performance parameters of the aerial vehicle itself.

Displays 258 may also provide or incorporate a user interface for receiving operator commands regarding the operation of system 200. For example, displays 258 may be configured with a touch sensitive screen for receiving operator input to control or monitor one or more aspects of system 200. Displays 258 may be connected to one or more CPU's, memory, data buses, and software configured to respond to and/or carry out the operator's commands.

System 200 may additionally be configured for remote monitoring or operation of one or more aspects of system 200, such as boom 100. For example, system 200 may be configured to transmit and receive wireless data signals in real-time via satellite, cellular, or WiFi, for example, including any or all of the information displayable on displays 258 to a remote operator or monitor located on the ground or in the air.

Figure 20:
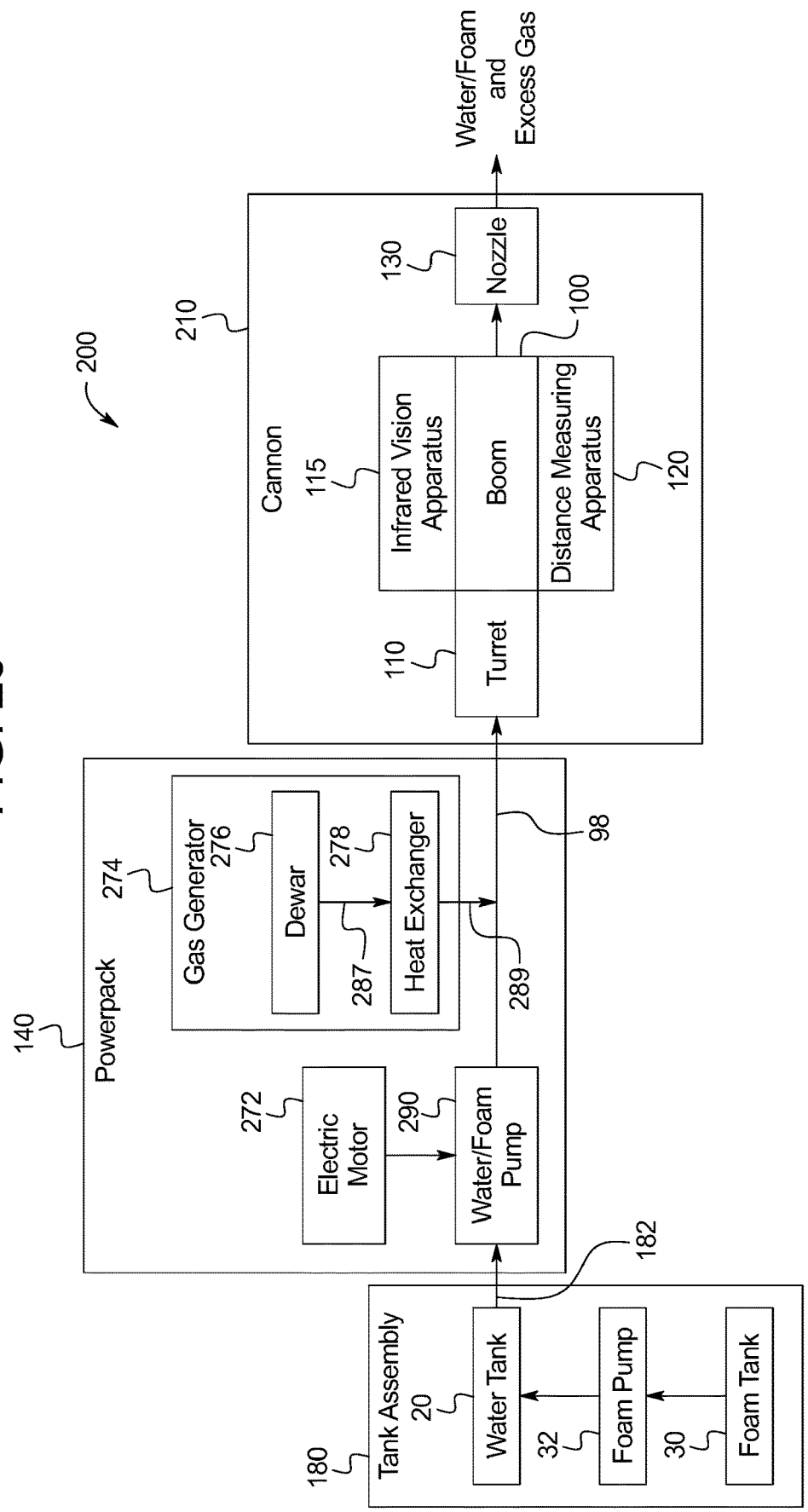
FIG. 20 illustrates a schematic of one embodiment of the aerial fire suppression system of FIG. 10.
Figure 21:
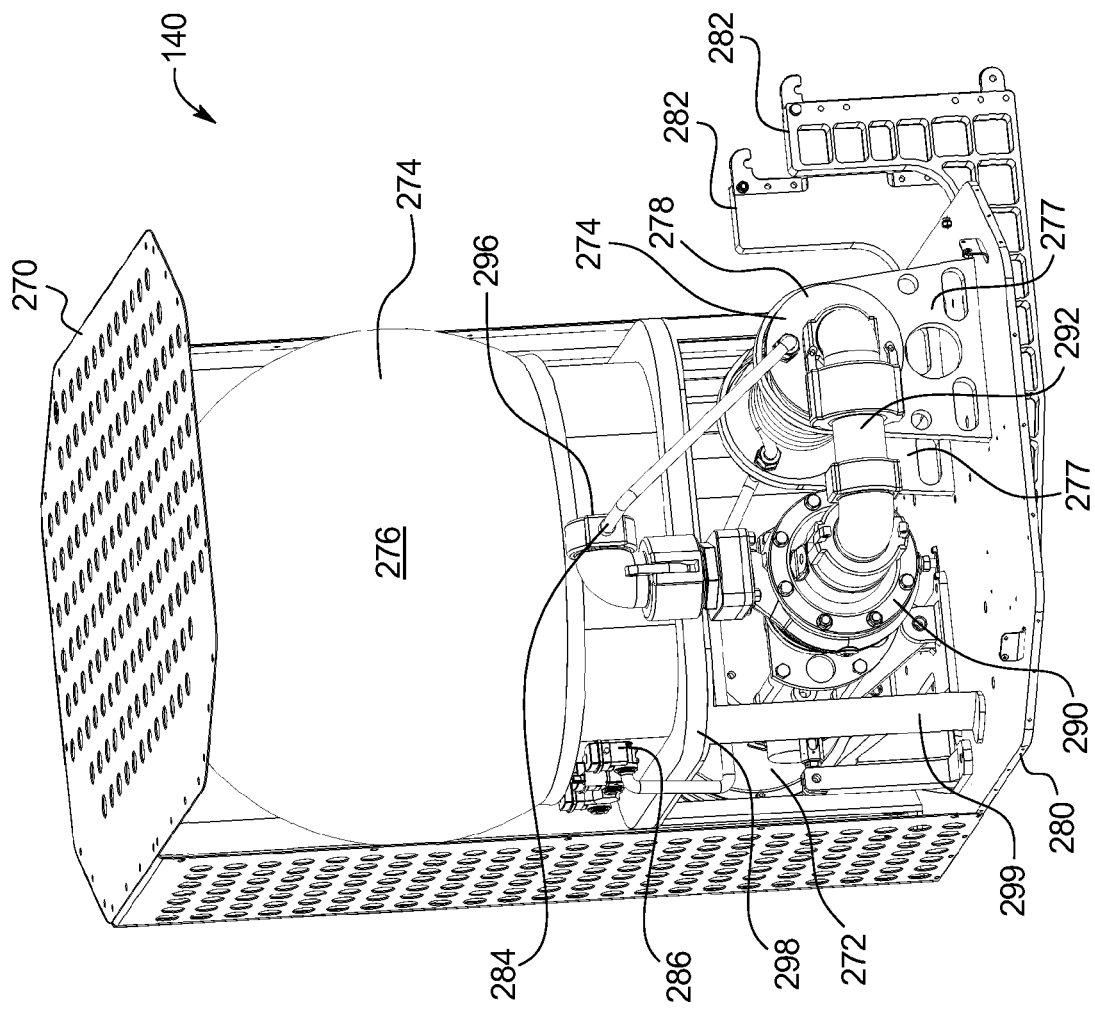
FIG. 21 illustrates a partial detailed right front perspective view of the powerpack shown in FIG. 20.
Figure 22:
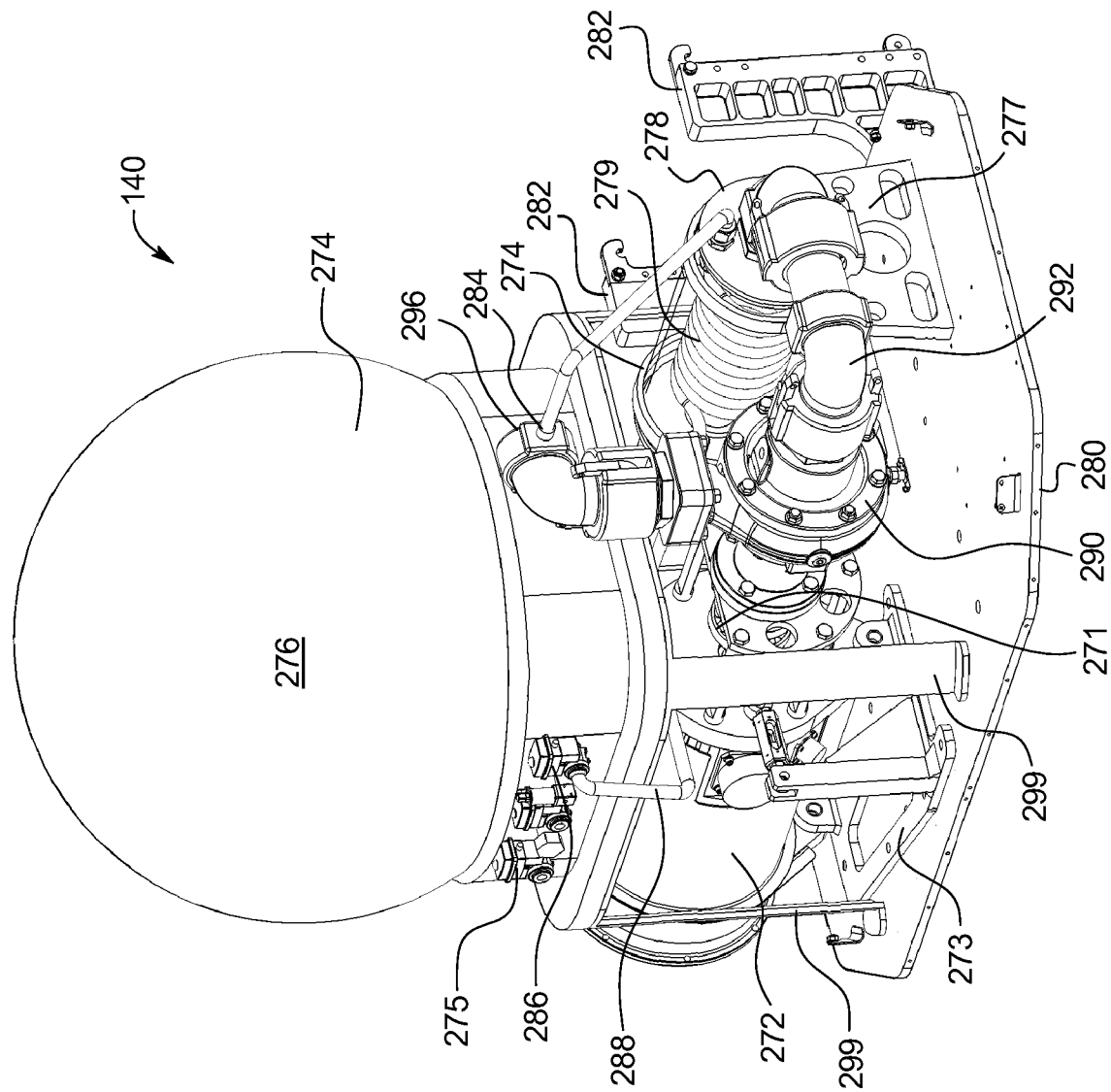
FIG. 22 illustrates a partial detailed right front perspective view of the powerpack shown in FIG. 20.
Figure 23:
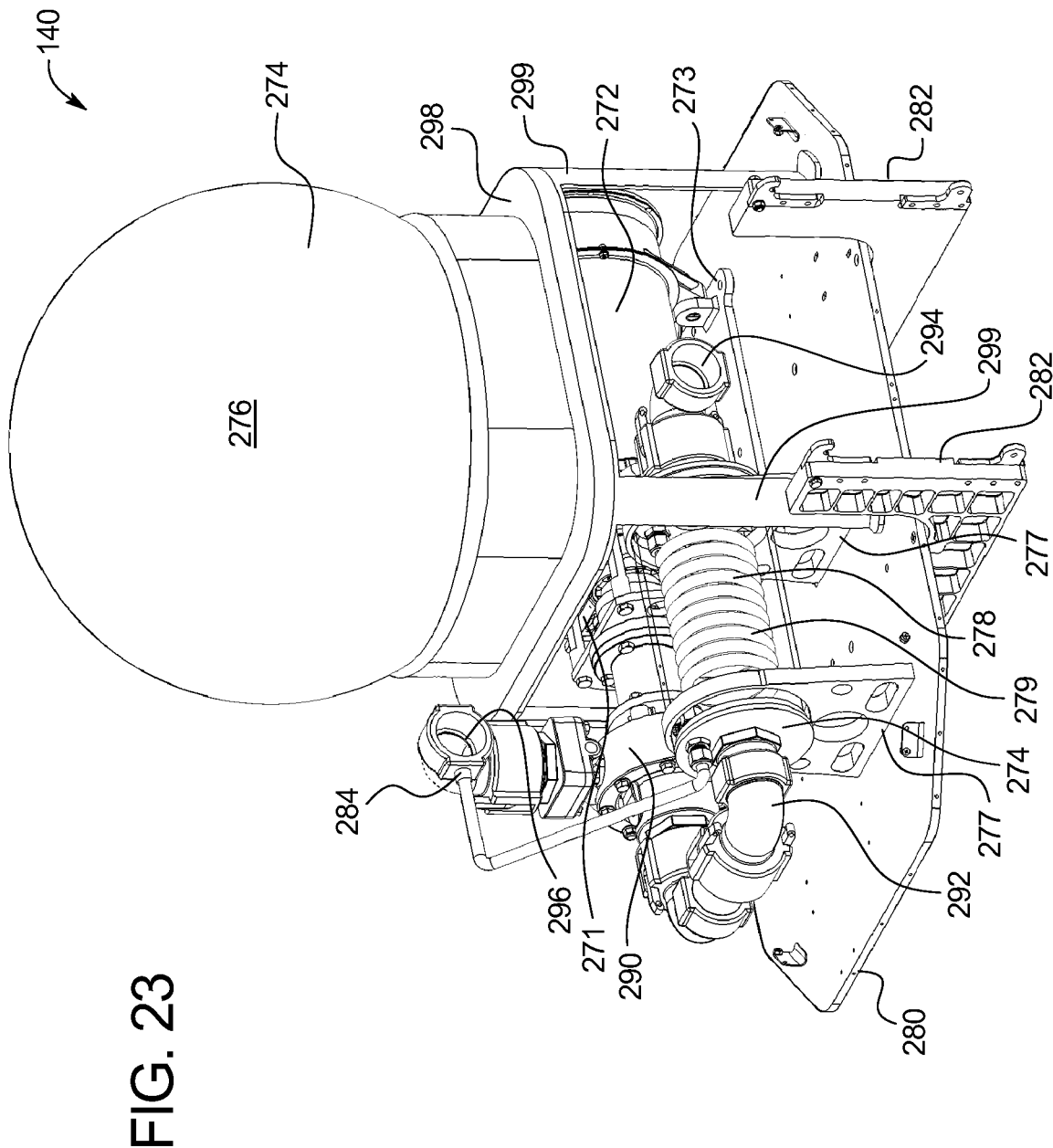
FIG. 23 illustrates a partial detailed left front perspective view of the powerpack shown in FIG. 20.

Turning now to FIG. 20, there is shown a schematic of one embodiment of system 200 including tank assembly 180, powerpack 140, and cannon assembly 210. Tank assembly 180 includes housing 238 (see, e.g., FIGS. 10-14) for housing and/or supporting water tank 20 and foam tank 30. Foam tank 30 may be mounted in, on, or to housing 238, whereas water tank 20 is housed within housing 238. In other embodiments, foam tank 30 may be housed elsewhere on system 200 or the aerial vehicle. Tank assembly 180 also includes foam pump 32, which like foam tank 30, may be mounted in, on, or to housing 238, or may be mounted elsewhere on system 200 or the aerial vehicle. Using foam pump 32, as directed by the operator using, for example, one of the controls discussed above at operator station 240, foam or foam concentrate of a known amount is drawn from foam tank 30 and added to a known amount of water in water tank 20 to create a water/foam batch mixture having a desired concentration of foam to water ranging from approximately 1% to approximately 10%.

In a configuration of system 200, foam tank 30 comprises approximately 5% to approximately 10% by volume of the amount of water carried in water tank 20. As described above for system 10, the foam to water ratio of system 200 may range from a wet foam to a dry foam of approximately 0.1% to approximately 10.0%, as directed by an operator of system 200. The foam to water ratio of system 200 may alternatively range from approximately 0.4% to approximately 1.0%.

Powerpack 140 includes gas generator 274, electric motor 272, water/foam pump 290, and enclosure 270 for protecting these components from damage. Powerpack 140 is configured to provide water/foam/gas mixture 98 to boom 100 at approximately 20 to approximately 150 gallons per minute (gpm). Enclosure 270 may be configured as a plurality of individually removable, lightweight yet sturdy panels or panel subassemblies to enclose or partially enclose powerpack 140.

FIGS. 21-24 better illustrate some of the components of powerpack 140 including gas generator 274. Like gas generator 70 discussed above, gas generator 274 is configured to produce gas to aid in the creation of tightly-formed foam bubbles of an optimum size with water/foam solution 182 before ejection of the mixture from nozzle 130 of boom 100 and to aid in achieving the greatest possible distance of the water/foam/gas mixture downrange of nozzle 130. To produce gas, gas generator 274 differs from gas generator 70 in that it includes a store of liquid nitrogen that is passed through a heat exchanger to cause the liquid nitrogen to rapidly reach its boiling point to produce nitrogen gas in an amount equal to approximately 700 times the volume of liquid nitrogen.

More particularly, gas generator 274 of system 200 includes dewar 276 for receiving and storing a quantity of liquid nitrogen aboard the aerial vehicle. In one embodiment, dewar 276 having model number 10C-0012-75, which is available from Essex Aerospace, is an approximately 22 inch vessel that is capable of holding approximately 20 gallons of liquid nitrogen, and weighs approximately 85 lbs empty and approximately 275 lbs when filled with liquid nitrogen.

Dewar 276 includes a pressure build cycle to continuously pressurize the ullage space above the liquid nitrogen level for pressurized delivery of the liquid nitrogen to heat exchanger 278, and includes safety devices such as one or more pressure relief valves and burst valves to prevent over pressurization of dewar 276. To pressurize the liquid nitrogen, a valve at or near the bottom of dewar 276 is opened to allow a portion of the liquid nitrogen stored in dewar 276 to be directed to a heat exchanger built into or on dewar 276 to create nitrogen gas that is then returned to the top of dewar 276 to pressurize the ullage space. This process, together with one or more pressure relief valves, maintains a desired pressure in dewar 276 whenever liquid nitrogen is being drawn from dewar 276 during operation of system 200.

Upon opening valve 286, as directed by an operator using, for example, one of the controls discussed above at operator station 240, conduit 288 directs liquid nitrogen 287 from dewar 276 to coil 279 of heat exchanger 278, which is shown with its housing removed for clarity. At the same time, water/foam solution 182 at ambient temperature from water tank 20 is drawn by water/foam pump 290 to inlet 294 and through heat exchanger 278 to cause liquid nitrogen 287 in coil 279 to rapidly reach its boiling point to generate nitrogen gas 289. The water/foam solution 182 is then drawn by water/foam pump 290 via conduit 292 and expelled by water/foam pump 290 at discharge 296. Nitrogen gas 289 exiting heat exchanger 278 is then injected into water/foam solution 182 downstream of water/foam pump 290 at point 284 in an amount of approximately 75 scfm and at approximately 150 psi. The injection of the 150 psi nitrogen gas 289 compresses water/foam solution 182 for delivery through conduit 266 to boom 100. In addition, water/foam solution 182 exiting heat exchanger 278 may be slightly colder than ambient as a result of the heat exchange with the liquid nitrogen 287, which may aid suppression of a fire when ejected from boom 100. Dewar 276 having a 20 gallon liquid nitrogen capacity will provide approximately 75 scfm at approximately 150 psi of nitrogen gas 289 to provide approximately 1 hour of operation of system 200 on a target. Dewar 276 may be scaled in physical size and capacity, either larger or smaller, along with the other elements of system 200, to accommodate the payload carrying capacity of the aerial vehicle on which it is mounted.

Figure 24:
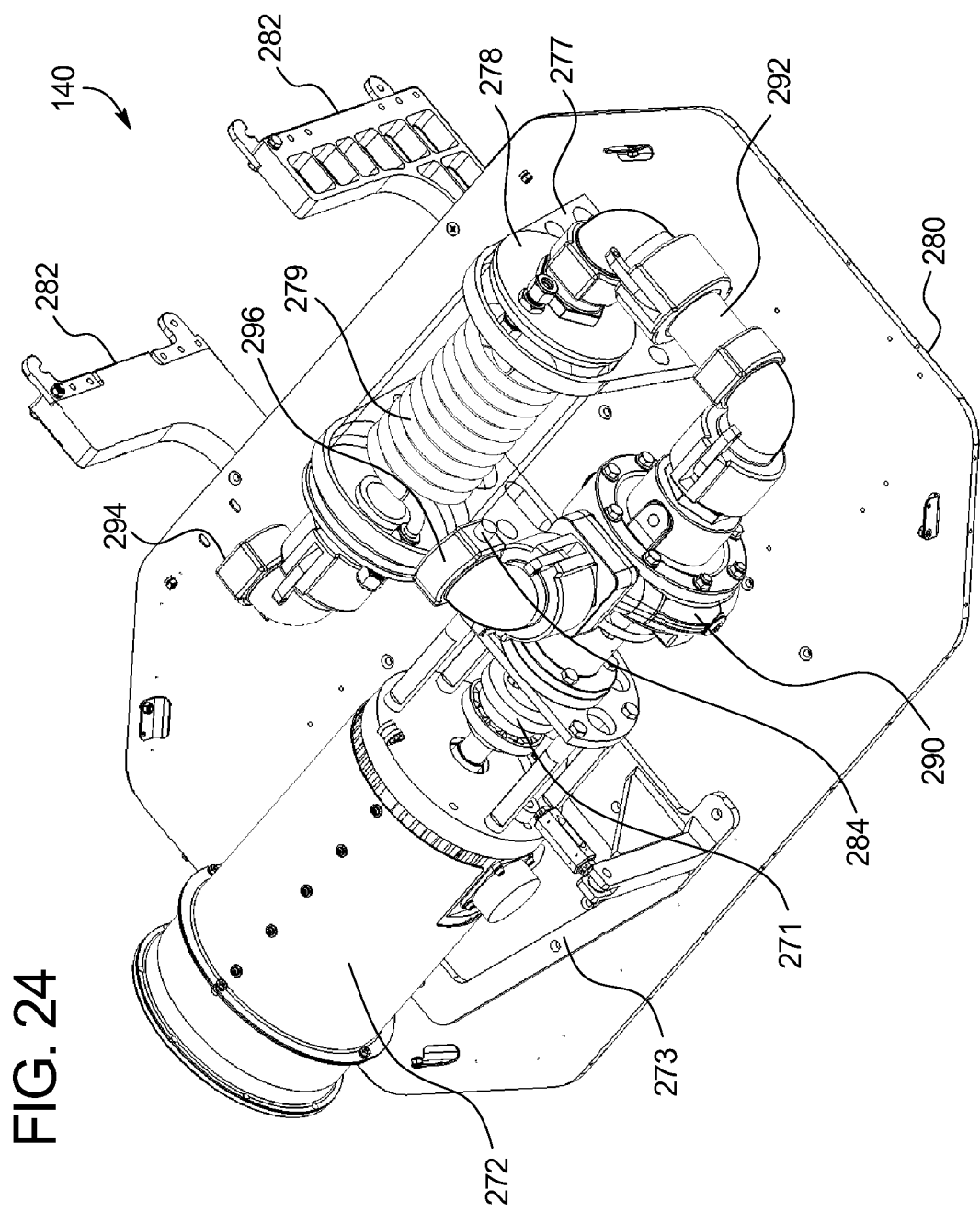
FIG. 24 illustrates a partial detailed top perspective view of the powerpack shown in FIG. 20.

Water/foam pump 290 may be configured as a centrifugal pump with a radial outflow impeller 291. To drive water/foam pump 290, as best shown in FIG. 24 with dewar 276 and other hardware removed for clarity, powerpack 140 includes electric motor 272 directly coupled to water/foam pump 290 with coupler 271. Electrical power to operate system 200, including cannon assembly 210, operator station 240, and powerpack 140 including electric motor 272, may be obtained from the electrical bus of the aerial vehicle, from an electrical generator connected to the engine or transmission of the aerial vehicle, or from an auxiliary power unit (APU). In the embodiment of FIGS. 21-24, electric motor 272 is configured to turn at approximately 8000 RPM, while water/foam pump 290 is configured to turn at a rated speed of approximately 9400 RPM. Consequently, to operate water/foam pump 290 at maximum rated speed without overspeeding electric motor 272, electric motor 272 may be coupled to a gearbox, which in turn, may be coupled to water/foam pump 290. In one embodiment, electric motor 272 comprising model number 6200-10 available from K-Tech provides 30 HP at 7800 RPM while drawing approximately 75 amps at 115/200 VAC, 3-phase at 400 Hz, and weighs approximately 70 lbs and measures approximately 18 inches long×12 inches wide×11.5 inches high.

For compact assembly of powerpack 140, base 298 having stanchions 299 may be connected to base 280 to raise and support dewar 276 above electric motor 272, water/foam pump 290, and heat exchanger 278. Bracket 273 may be connected to base 280 to support electric motor 272. Brackets 277 may be connected to base 280 to support heat exchanger 278.

Gas generator 274 of system 200 is configured for either quick refill of dewar 276 through intake valve 275 or by swapping empty dewar 276 with a full one. Plumbing and wiring to dewar 276 having quick disconnect features may assist the replacement of dewar 276.

In one embodiment of system 200 comprising gas generator 274 having dewar 276, where dewar 276 is sized to hold approximately 20 gallons of liquid nitrogen, water tank 20 is sized to hold approximately 800 gallons of water, foam tank 30 is sized to hold approximately 80 gallons of foam or foam concentrate, the dry weight of system 200 is approximately 1080 lbs, and when fully loaded with consumables, such as liquid nitrogen, water and foam, the weight of system 200 is approximately 7890 lbs. At an approximately 0.5% foam to water ratio, system 200 having this configuration is capable of 5 minutes of use on-station.

Figure 25:
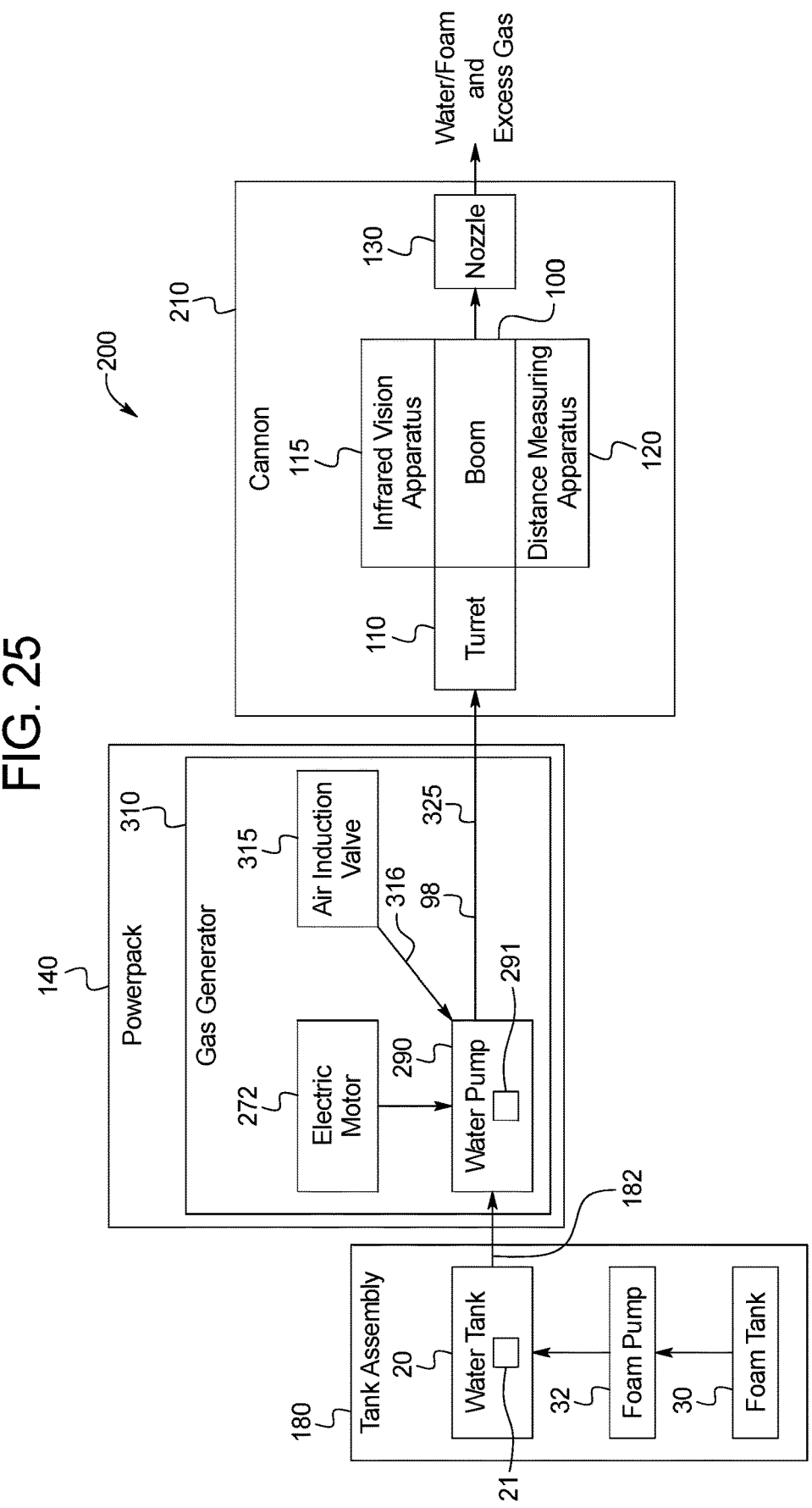
FIG. 25 illustrates a schematic of another embodiment of the aerial fire suppression system of FIG. 10.
Figure 26:
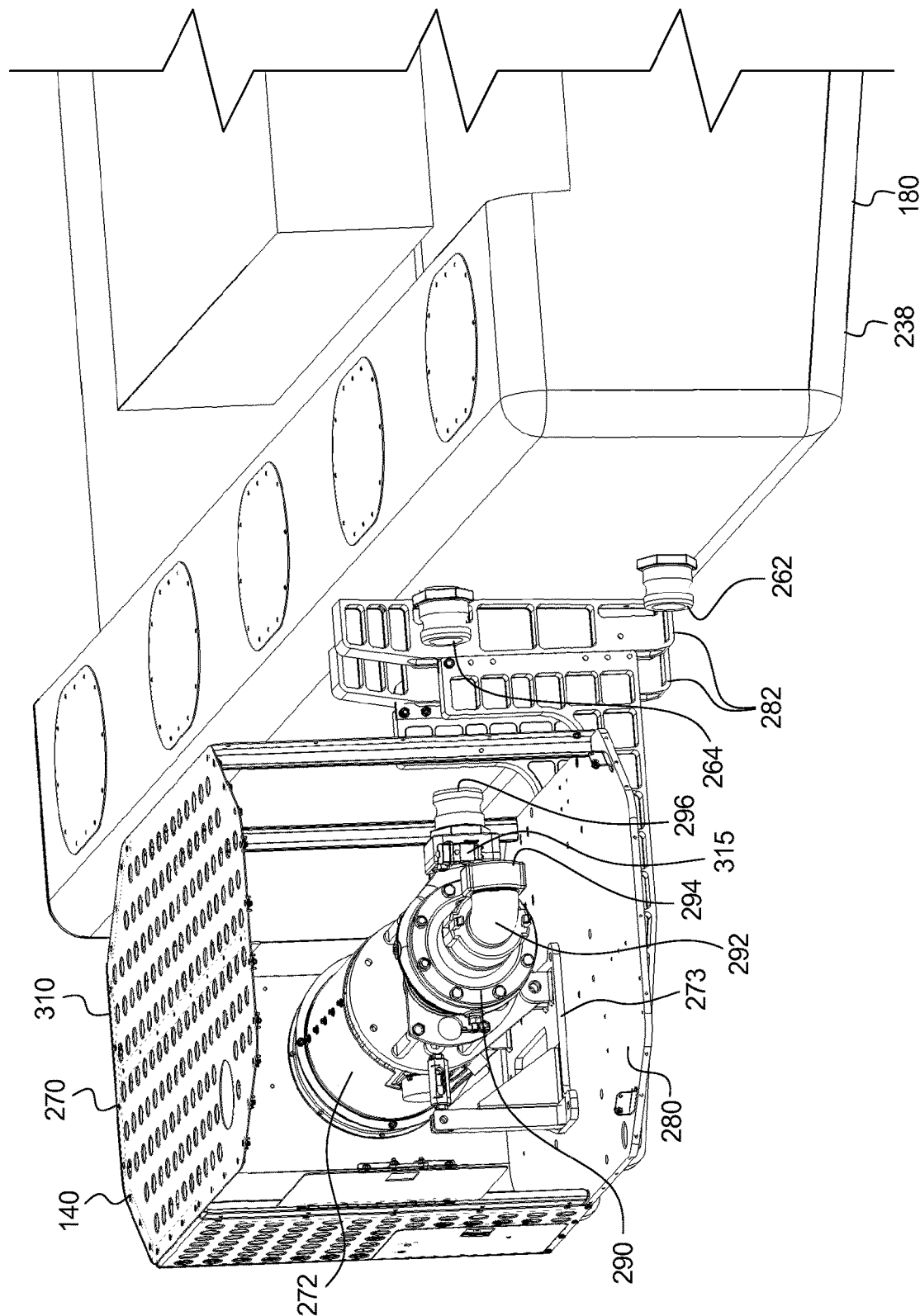
FIG. 26 illustrates a partial detailed right front perspective view of the powerpack shown in FIG. 25.
Figure 27:
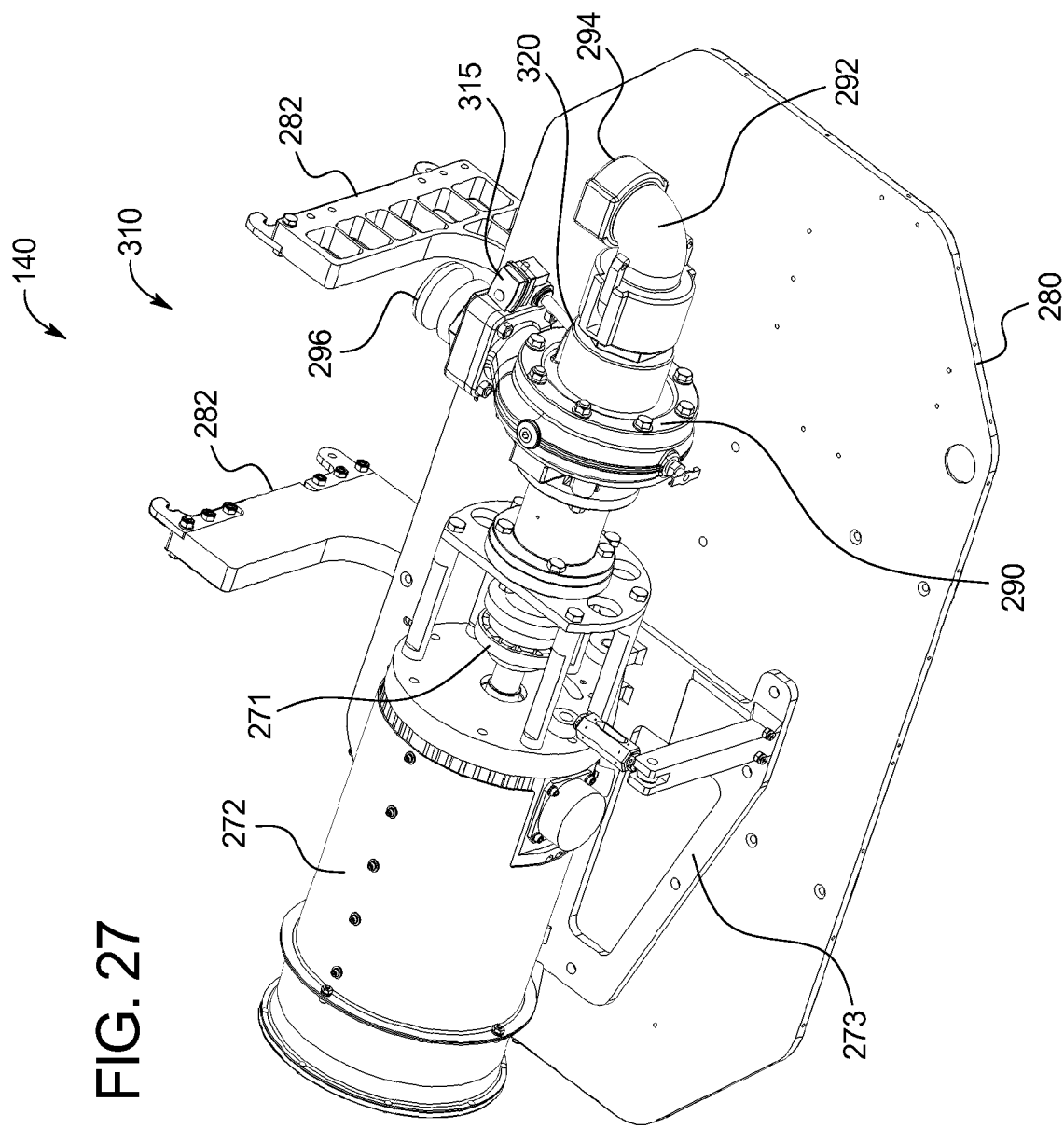
FIG. 27 illustrates a partial detailed top perspective view of the powerpack shown in FIG. 25.

Turning now to FIG. 25, there is shown a schematic of another embodiment of system 200 including tank assembly 180, powerpack 140, and cannon assembly 210. In this embodiment, powerpack 140 includes gas generator 310, which unlike gas generator 274, which generates nitrogen gas 289 to compress water/foam solution 182, water/foam pump 290 of gas generator 310 draws in atmospheric air and pressurizes the air along with water/foam solution 182. As best shown in FIG. 26, system 200 incorporating gas generator 310 provides for a more compact powerpack 140 and reduces weight and system complexity over system 200 incorporating gas generator 274, but potentially with a slight decrease in quality of foam due to slightly less air volume to pressurize water/foam mixture 182.

More particularly, gas generator 310 of system 200 includes adjustable air induction valve 315 connected to water/foam pump 290, which is driven by electric motor 272. As directed by an operator using, for example, one of the controls discussed above at operator station 240, water/foam pump 290 is triggered "on" to draw water/foam solution 182 from water tank 20. At the same time, air induction valve 315 may be automatically or manually commanded to its "open" position, whereby atmospheric air 316 is drawn into the suction side of water/foam pump 290 at point 320 at the rate of approximately 30 CFM to approximately 50 CFM. In one embodiment, air induction valve 315 comprises an electrically variable valve opening, controllable by an operator, to vary the amount of air introduced into the suction side of water/foam pump 290 while water/foam pump 290 is driven at a constant speed.

Water/foam pump 290 then pressurizes air 316 along with water/foam solution 182 to approximately 125 psi and expels the pressurized water/foam/air solution 325 at discharge 296 at approximately 150 gpm. The introduction of air 316 by system 200 for mixing with and pressurization of water/foam solution 182 for delivery through conduit 266 to boom 100 aids in the creation of tightly-formed foam bubbles of an optimum size before ejection of the mixture from nozzle 130 of boom 100 and to aid in achieving the greatest possible distance of the mixture downrange of nozzle 130. Because water/foam pump 290 turns at a relatively high speed of approximately 9400 RPM, it does not appreciably lose suction when drawing in the approximately 30-50 CFM of air 316 along with water/foam solution 182. And because air 316 is a limitless resource when drawn from the atmosphere, time on-station over a target, such as a fire, would be limited to the amount of other consumables carried aboard the aerial vehicle, such as water, foam, or fuel. Consequently, system 200 including gas generator 310 provides a simplified, highly efficient means for providing compressed air foam aboard aerial vehicles for use in engaging a target.

In one embodiment of system 200 comprising gas generator 310, where water tank 20 is sized to hold approximately 800 gallons of water, foam tank 30 is sized to hold approximately 80 gallons of foam or foam concentrate, the dry weight of system 200 is approximately 1015 lbs, and when fully loaded with consumables, such as water and foam, the weight of system 200 is approximately 7580 lbs. At an approximately 0.5% foam to water ratio, system 200 having this configuration is capable of 5 minutes of use on-station.

Figure 28:
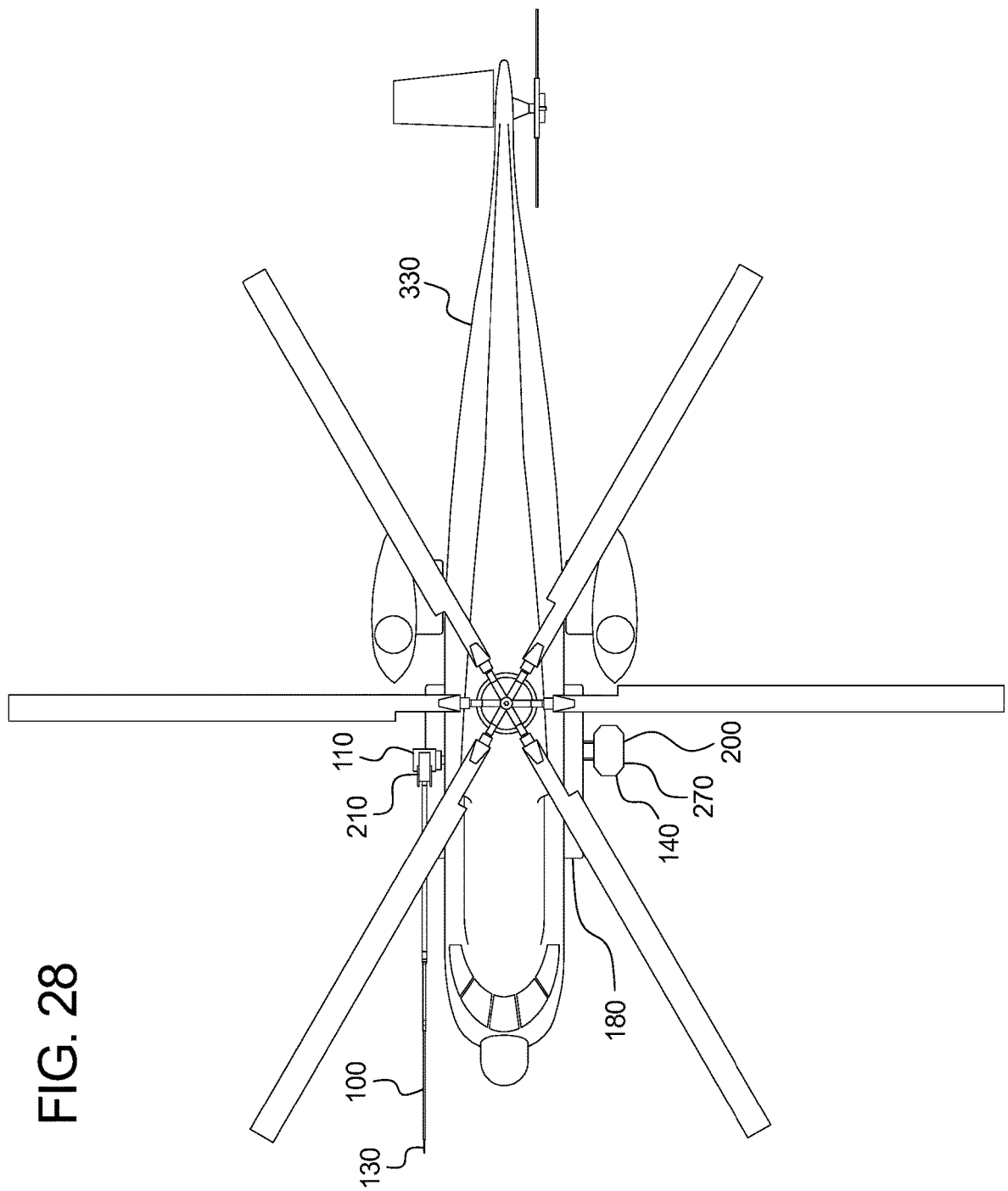
FIG. 28 illustrates a top view of a helicopter having the aerial fire suppression system of FIG. 10 mounted thereto.
Figure 29:
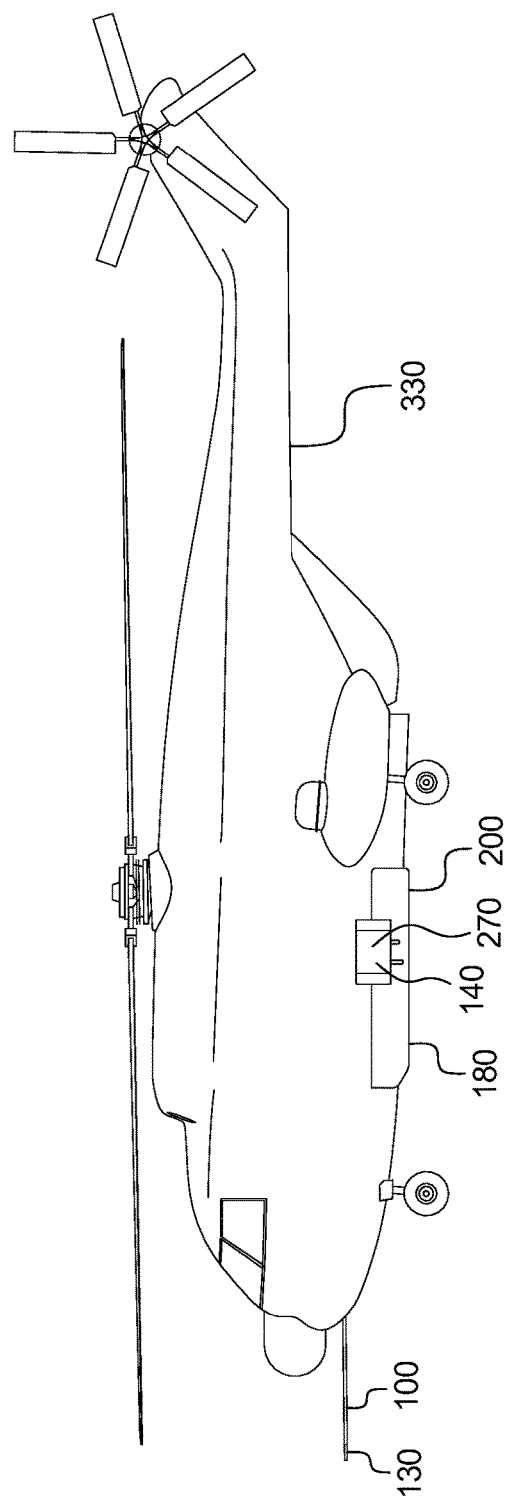
FIG. 29 illustrates a left side view of the helicopter shown in FIG. 25 having the aerial fire suppression system of FIG. 10 mounted thereto.
Figure 30:
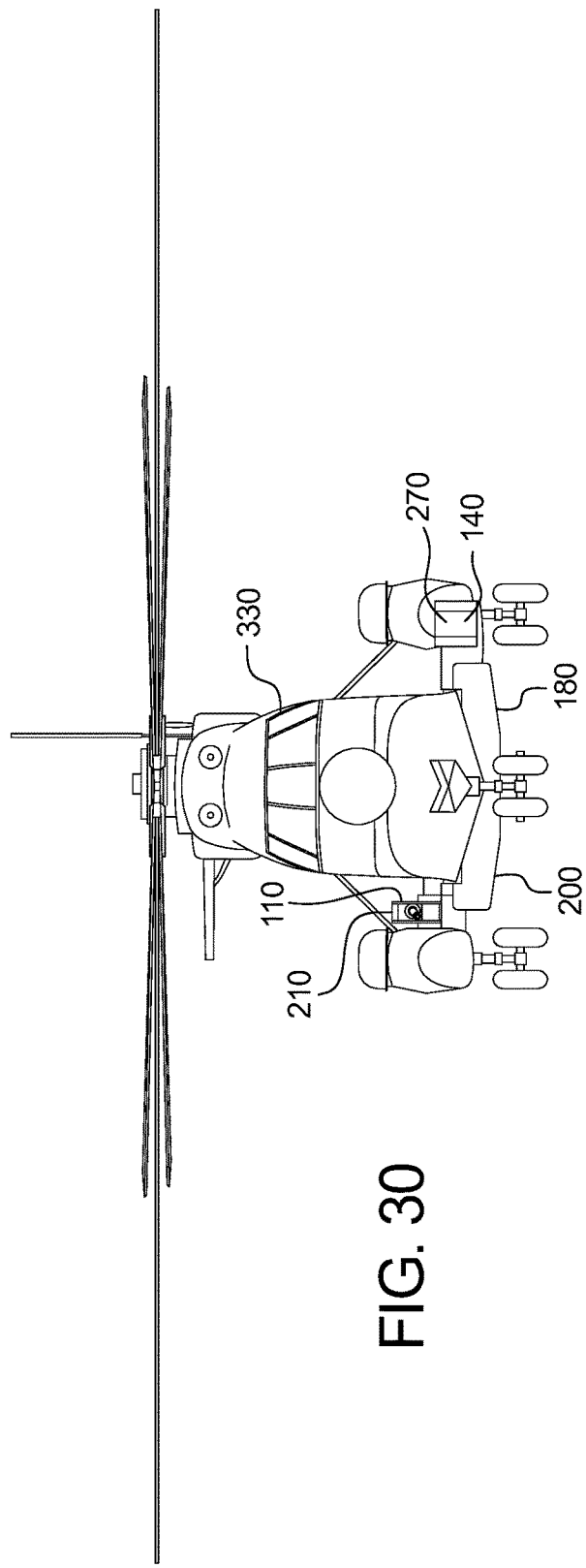
FIG. 30 illustrates a front view of the helicopter shown in FIG. 25 having the aerial fire suppression system of FIG. 10 mounted thereto.

Turning to FIGS. 28-30 illustrate the integration of system 200 with a helicopter. Tank assembly 180 of system 200 is shown mounted externally to helicopter 330 along the underside of the fuselage. Cannon assembly 210 with turret 110 and boom 100 is shown with boom 100 in the stowed position along the starboard side of helicopter, with nozzle 130 of boom 100 pointed in the direction of the nose of helicopter 330. Powerpack 140 is shown mounted to tank assembly 180 on the port side of helicopter 330, opposite cannon assembly 210 to counterbalance the weight of cannon assembly 210. System 200 is positioned aft of the nose of helicopter 330 at or near the helicopter's center of gravity. System 200 is configured to optimize the flying characteristics of helicopter 330 with system 200 attached thereto and throughout the operation of system 200 and helicopter 330.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

What is claimed is:

1. A fire suppression apparatus for fighting fires from an aerial vehicle, comprising:
   a water tank for housing water, the water tank configured for attachment to the aerial vehicle;
   a foam tank for housing a foam concentrate, wherein the water tank is configured to receive the foam concentrate from the foam tank that when mixed with the water in the water tank forms a batch of a liquid water/foam solution in the water tank;
   a water/foam pump supportable by the aerial vehicle, the water/foam pump including an impeller driven by an electric motor, the water/foam pump including a variable opening air induction valve disposed at and connected to a suction end of the water/foam pump so as to form an air inlet, wherein air and the liquid water/foam solution are drawn into the suction end and pressurized by the water/foam pump for discharge toward a target; and
   including one or more electronic controllers in operative communication with the electric motor and the air induction valve, wherein the one or more electronic controllers are configured to automatically open the air induction valve upon activation of the water/foam pump.

2. The fire suppression apparatus of claim 1, wherein the foam tank is defined by a bladder for housing the foam concentrate and the bladder is inside the water tank.

3. The fire suppression apparatus of claim 1, wherein the foam tank is replenishable with foam concentrate.

4. The fire suppression apparatus of claim 1, wherein the water tank is replenishable with water.

5. The fire suppression apparatus of claim 2, comprising a retractable pump system to replenish the water tank with water, the retractable pump system including a collapsible hose connected on a first end to a reversible, motorized reel for deploying and retrieving the hose, and a submersible water pump positioned on a second end of the hose for pumping water from a water source to the water tank.

6. The fire suppression apparatus of claim 1, including an aimable boom supportable by the aerial vehicle, the aimable boom including a nozzle configured to expel the pressurized air and liquid water/foam solution toward the target.

7. The fire suppression apparatus of claim 6, wherein a foam concentrate-to-water ratio of the liquid water/foam solution introduced to the boom is the same foam concentrate-to-water ratio of the liquid water/foam solution leaving the water tank.

8. The fire suppression apparatus of claim 6, wherein the aerial vehicle is an aircraft and the boom is aimable within a range from horizontally to approximately 40 degrees downwardly of the aircraft.

9. The fire suppression apparatus of claim 6, wherein the aerial vehicle is a rotorcraft and the boom is configured to extend at least one meter beyond an outer tip of a rotor of the rotorcraft.

10. The fire suppression apparatus of claim 6, wherein the boom is supported by the water tank opposite the water/foam pump and the electric motor to counterbalance the water/foam pump and the electric motor.

11. The fire suppression apparatus of claim 1, including a foam pump configured to pump the foam concentrate from the foam tank to the water tank.

12. The fire suppression apparatus of claim 1, wherein the water/foam pump is supported on a flat upper surface of a base, and the base is cantileverly mounted to the water tank via a pair of brackets.

13. The fire suppression apparatus of claim 12, wherein at least one of the brackets includes a surface defining a plurality of recesses for reducing weight of the at least one of the brackets.

14. The fire suppression apparatus of claim 1, wherein the water/foam pump is configured to rotate at a rated speed of approximately 9400 rotations per minute and expel the pressurized air and liquid water/foam solution at approximately 150 gpm.

15. The fire suppression apparatus of claim 1, wherein the water/foam pump is a centrifugal pump with an axial inlet and a radial outflow impeller.

16. The fire suppression apparatus of claim 1, wherein the air reaching the water/foam pump via the air induction valve does not pass through an air compressor.

17. The fire suppression apparatus of claim 1, wherein the variable opening of the air induction valve receives unpressurized atmospheric air.

18. The fire suppression apparatus of claim 1, wherein each of the foam tank and the water tank have an interior volume for holding fluid and the interior volume of the foam tank is five to ten percent of the interior volume of the water tank.

19. The fire suppression apparatus of claim 1, wherein the water tank includes an anti-cavitation device mounted inside the water tank at a lowest point of the water tank.

20. A fire suppression apparatus for fighting fires from an aerial vehicle, comprising:
   a water tank for housing water, the water tank configured for attachment to the aerial vehicle;
   a foam tank for housing a foam concentrate, wherein the water tank is configured to receive the foam concentrate from the foam tank that when mixed with the water in the water tank forms a batch of a liquid water/foam solution in the water tank;
   a water/foam pump supportable by the aerial vehicle, the water/foam pump including an impeller driven by an electric motor, the water/foam pump including a variable opening air induction valve disposed at and connected to a suction end of the water/foam pump so as to form an air inlet, wherein air and the liquid water/foam solution are drawn into the suction end and pressurized by the water/foam pump for discharge toward a target; and
   an aimable boom supportable by the aerial vehicle, the aimable boom including a nozzle configured to expel the pressurized air and liquid water/foam solution toward the target, wherein the boom is supported by the water tank opposite the water/foam pump and the electric motor to counterbalance the water/foam pump and the electric motor.

* * * * *

UNITED STATES PATENT AND TRADEMARK OFFICE
CERTIFICATE OF CORRECTION

PATENT NO. : 11,439,852 B2
APPLICATION NO. : 16/532182
DATED : September 13, 2022
INVENTOR(S) : Mark D. Zimmerman et al.

Page 1 of 1

It is certified that error appears in the above-identified patent and that said Letters Patent is hereby corrected as shown below:

In the Specification

Column 1, Line 37, "(OAFS)" should be changed to --(CAFS)--.

Column 1, Line 50, "(OAFS)" should be changed to --(CAFS)--.

Column 5, Line 44, "Mo" should be changed to --MO--.

Signed and Sealed this
Tenth Day of January, 2023

Katherine Kelly Vidal
*Director of the United States Patent and Trademark Office*